(12) United States Patent
Kato et al.

(10) Patent No.: US 6,581,832 B1
(45) Date of Patent: Jun. 24, 2003

(54) OPTICAL READER HAVING INCLINABLE STAGE WHICH MOUNTS OPTICAL UNIT THEREON

(75) Inventors: Hiroaki Kato, Sagamihara (JP); Mitsuharu Ishii, Hachioji (JP); Toshitaka Aoki, Hachioji (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/253,943

(22) Filed: Feb. 22, 1999

(30) Foreign Application Priority Data

Jul. 17, 1998 (JP) .......................................... 10-203194

(51) Int. Cl.⁷ ............................................. G06K 7/10
(52) U.S. Cl. .................... 235/454; 235/462.43
(58) Field of Search ................... 235/454, 462.14, 235/462.17, 462.2, 462.43

(56) References Cited

U.S. PATENT DOCUMENTS

| | | | | |
|---|---|---|---|---|
| 4,158,194 A | * | 6/1979 | McWaters et al. ....... 340/146.3 |
| 4,672,184 A | | 6/1987 | Fujiwara et al. ............. 235/462 |
| 4,983,818 A | * | 1/1991 | Knowles ................ 235/462.47 |
| 5,140,141 A | * | 8/1992 | Inagaki et al. ......... 235/462.43 |
| 5,198,650 A | * | 3/1993 | Wike, Jr. ................ 235/472.01 |
| 5,206,491 A | * | 4/1993 | Katoh et al. ............. 235/462.4 |
| 5,347,910 A | | 9/1994 | Avila et al. ................. 89/41.22 |
| 5,349,497 A | * | 9/1994 | Hanson et al. ............... 361/683 |
| 5,371,348 A | * | 12/1994 | Kumar et al. .......... 235/472.02 |
| 5,430,283 A | | 7/1995 | Tanaka ........................ 235/462 |
| 5,449,891 A | | 9/1995 | Giebel ......................... 235/462 |
| 5,471,042 A | * | 11/1995 | Kirkeby et al. ........ 235/472.01 |
| 5,477,044 A | * | 12/1995 | Aragon .................. 235/472.01 |
| 5,478,998 A | | 12/1995 | Charych et al. |
| 5,479,002 A | * | 12/1995 | Heiman et al. ......... 235/462.45 |
| 5,563,735 A | | 10/1996 | Brueck ......................... 359/384 |
| 5,710,416 A | | 1/1998 | Belknap et al. ............. 235/383 |
| 5,726,434 A | * | 3/1998 | Seo ......................... 235/462.11 |
| 5,796,088 A | * | 8/1998 | Wall ...................... 235/472.01 |
| 5,889,268 A | * | 3/1999 | Swartz ......................... 235/385 |
| 6,065,676 A | * | 5/2000 | Ring et al. ............. 235/462.43 |

FOREIGN PATENT DOCUMENTS

| | | |
|---|---|---|
| EP | 0 270 338 | 6/1988 |
| EP | 0 461 673 A2 | 6/1991 |
| EP | 0 461 673 | 12/1991 |
| EP | 0 686 930 | 12/1995 |
| EP | 0 755 018 A2 | 1/1997 |
| JP | 59-165042 | * 9/1984 |

OTHER PUBLICATIONS

Office Action of corresponding European application, 99 113 628.4–1524, dated Jun. 6, 2001, with English translation.

* cited by examiner

Primary Examiner—Diane I. Lee
(74) Attorney, Agent, or Firm—Armstrong, Westerman & Hattori, LLP

(57) ABSTRACT

An optical reader which is compatible with every environment irrespective of installation and usage environments, thereby enabling uniform manufacturing, satisfactory reading reliance, and operative safety and user-friendliness. The optical unit is mounted on the stage, and there is provided an inclination apparatus which inclines the stage at a desired angle. Thereby, without changing a preset optimal scanning pattern, only its emitting direction becomes freely changeable.

1 Claim, 19 Drawing Sheets

OPTICAL READER HAVING INCLINABLE STAGE WHICH MOUNTS OPTICAL UNIT THEREON

BACKGROUND OF THE INVENTION

1. Field of the Invention

The present invention relates generally to optical readers, and more particularly to an optical reader that changes a light scanning direction. The optical reader of the present invention is especially suitable for barcode scanners which optically read a barcode put on merchandises in POS systems and the like.

2. Description of the Related Art

Recently, barcode scanners have become more frequently used for cashiers in supermarkets, discount stores, home centers, etc. In general, operators who use a barcode scanner fixed onto a cashier table move a merchandise on which a barcode is printed, whereby the merchandise may pass across a scanning pattern emitted in a predetermined direction from a read window of the barcode scanner.

The scanning pattern is usually fixed to one pattern, and its emitting direction is preset and fixed in accordance with the installation and usage environments of the scanner at the time of manufacturing. The "installation environment", as used herein, means a direction in which the read window is to be installed in a cashier table; more concretely, whether the read window is arranged parallel or perpendicular to the cashier table. The former barcode scanner is called a lateral type, and the latter a longitudinal type. The "usage environment", as used herein, means a moving path of a merchandise onto which a barcode is printed; for example, whether the merchandise is to be moved from right to left or left to right, even in the same lateral type. The usage environment depends upon each operator's height, experience and the like. The emitting direction is usually preset and inclined by a predetermined angle relative to a direction perpendicular to the read window, toward an upper stage from which a merchandise comes (for instance, which is a right side if the merchandise moves from right to left).

With the spread of barcode scanners, prompt reading of barcodes and efficient manufacturing of the barcode scanners has been strongly demanded.

However, the conventional longitudinal and lateral barcode scanners are different in manipulation and optimal scanning-pattern emitting directions. Even in the same lateral type, a proper emitting direction is different between one which moves merchandise from right to left, and another which moves merchandises from left to right. Therefore, in an attempt to install and use the conventional barcode scanners each store has ordered apparatuses having a different pattern emitting directions which correspond to their installation and usage environments.

A change of the emitting direction requires a change of inclination of an optical system that generates a scanning pattern and/or an arrangement of optical element(s). Consequently, each barcode scanner even for the same type, should be manufactured differently in emitting direction for every business type of different installation and usage environments, causing inefficient manufacturing and price increasing. On the other hand, primarily for manufacturing purposes, there have been proposed apparatuses having a fixed emitting direction while the installation and usage environments are ignored, but these apparatuses cannot generate an optimal pattern to achieve an object of prompt reading.

On the other hand, the actual prompt reading depends, in addition to the scanning pattern, upon a moving path of merchandise (or barcode) by an operator. Even in a barcode scanner in which the scanning pattern is fixed to the optimal pattern for the installation and usage environments, a moving path slightly different among operators depending upon their heights, experiences, skillful hands, habits, etc. Disadvantageously, each operator must adjust a barcode moving path and spend a long time to master the operating skill.

To eliminate these problems, applicant has proposed, in Japanese Laid-Open Patent Application No. 9-16705, a barcode reader that generates a plurality of scanning patterns by making mirrors movable in the optical system, extending a scan area, and selecting one frequently used scanning pattern from them. Nevertheless, this invention was disadvantageous because it has a low reading reliance and does not always meet operative safety requirements.

The scanning pattern frequently used in this reference is not the actual optimal scanning pattern that has a high barcode-reading reliability. The optimal scanning pattern is one determined as a result of simulation taking into account the arrangement between a laser source and a light receiving element, while minimizing optical noises caused by mirror angles and the light amount of the laser beam. A scanning pattern including optical noises, even though hitting a barcode, cannot properly read the barcode data. For instance, a certain mirror angle puts the reflected light over the store's light as a noise, and the light receiving element receives a large amount of incident light. A laser beam reflected at an edge or the like of the reflection mirror also causes a large amount of light incident to the light receiving element. In this way, a plurality of scanning patterns which have been generated only by taking into account the usage environment without paying attention to the optical noises would lower the reading reliance and delay the reading time. It is preferable to maintain the optimal scanning pattern that is set at the time of manufacturing.

In addition, as seen in the International Standard IEC and the U.S. Standard CDRH, which take care of human eyes subject to a laser beam, the laser safety standards define certain restrictions regarding the light amount of an incident laser beam. However, the light amount of an arbitrarily changed scanning pattern would not necessarily meet the above standards, thereby endangering safety.

BRIEF SUMMARY OF THE INVENTION

Accordingly, it is a general object of the present invention to provide a novel and useful optical reader in which the above disadvantages are eliminated.

More specifically, it is another object to provide an optical reader which enables uniform manufacturing irrespective of the installation and usage environments.

It is still another object of the present invention to provide an optical reader that is user-friendlier than the conventional ones.

It is another object of the present invention to provide an optical reader which maintains the optimal scanning pattern and has a high reading reliance.

It is still another object of the present invention to provide an optical reader that meets the laser safety standards and secures safety.

In order to achieve the above objects, an optical device of the present invention comprises an optical unit which generates a predetermined scanning pattern, emits the predetermined scanning pattern to an optically readable medium, and receives light reflected from the medium, a stage which mounts an optical system at least necessary to generate the predetermined scanning pattern from among the optical unit, and an inclination apparatus which inclines the stage.

Another optical device of the present invention comprises an optical device which includes a housing having a plurality of reading windows, a plurality of optical units accommodated in said housing, the number of the optical units corresponding to the number of reading windows, each optical unit generating a predetermined scanning pattern, emitting the predetermined scanning pattern to an optically readable medium, and receiving light reflected from the medium, a stage, accommodated in the housing, which mounts an optical system at least necessary to generate the predetermined scanning pattern from among the optical unit, and an inclination apparatus, accommodated in the housing, which inclines the stage.

Still another optical device of the present invention comprises an optical unit which generates a predetermined scanning pattern, emits the predetermined scanning pattern to an optically readable medium, and receives light reflected from the medium, a stage which mounts an optical system at least necessary to generate the predetermined scanning pattern from among the optical unit, an inclination apparatus which inclines the stage, and a controller connected to the inclination apparatus, the controller controlling the inclination of the stage by the inclination apparatus.

A scanning method of the present invention comprises the steps of generating a predetermined scanning pattern to read out an optically readable medium, changing an emitting direction of the predetermined scanning pattern to a desired direction while maintaining the predetermined pattern, emitting the predetermined scanning pattern to the desired direction, and reading out light reflected from the medium based on the predetermined pattern.

An optical device of the present invention comprises an optical unit which generates a predetermined scanning pattern, emits the predetermined scanning pattern to an optically readable medium, and receives light reflected from the medium, and an inclinable stage which mounts an optical system at least necessary to generate the predetermined scanning pattern from among the optical unit.

Thus, the optical readers and scanning method of the present invention may change a scanning-pattern emitting direction while maintaining the predetermined scanning pattern.

Other objects and further features of the present invention will become readily apparent from the following description and accompanying drawings.

DETAILED DESCRIPTION OF PREFERRED EMBODIMENTS

Figure 1:
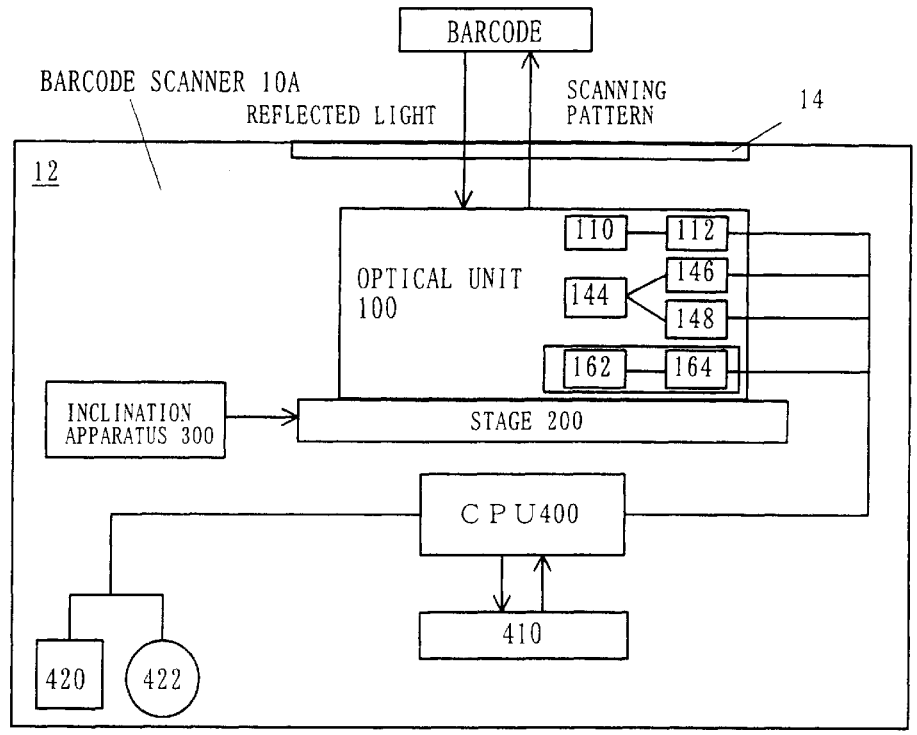
FIG. 1 is a block diagram showing a principle of a barcode scanner of a first embodiment according to the present invention.

Referring to the accompanying drawings, a description will be given of barcode scanner 10A of a first embodiment according to the present invention. Hereinafter, the same elements are designated by the same reference numerals, and a description thereof will be omitted. In addition, in the following description, barcode scanner 10 generalizes barcode scanners 10A, 10B, etc.

The barcode scanner 10A of the present invention, formed as a rectangular parallel shaped module (housing 12), emits a scanning pattern onto a barcode as a readable object through read window 14 in the housing 12, receives light reflected from the barcode, and reads the barcode data. The housing 12 may includes a plurality of read windows or is formed to be bendable, as seen in barcode scanner 10E which will be described later with reference to FIG. 30.

The barcode scanner 10A in FIG. 1 includes optical unit 100 which generates a scanning pattern, emits it in a predetermined direction, and receives light reflected from a barcode, stage 200 which mounts the optical unit 100, inclination apparatus 300 which inclines the stage 200 with the optical unit 100, and CPU 400 which controls the optical unit 100. Optionally, the CPU 400 may control the inclination apparatus 300, but this embodiment will be described later as barcode scanner 10C with reference to FIG. 18. The barcode scanner 10A may further include interface part 410 for exchanging data with an external POS terminal, a display part 420 which informs an operator whether it has recognized validly barcode data, and speaker 422, or the like.

Figure 2:
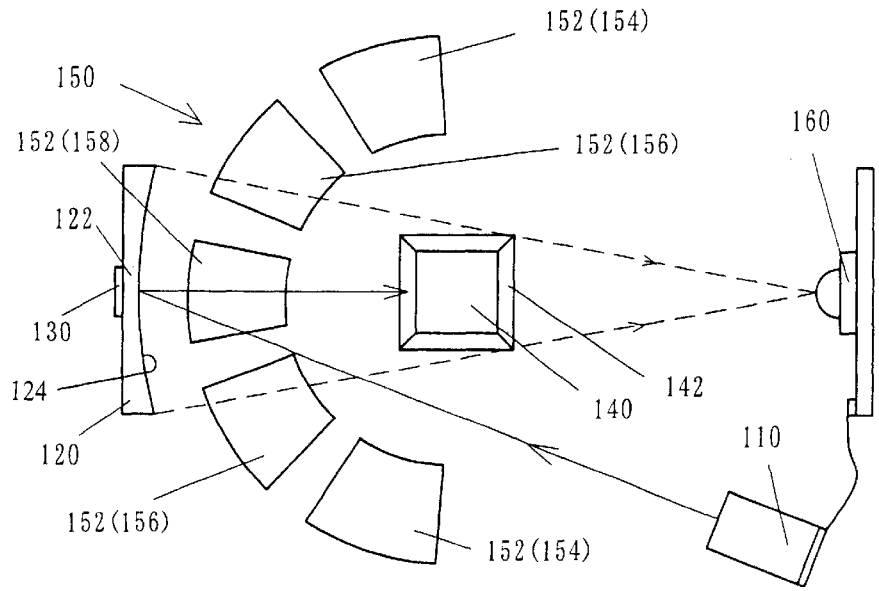
FIG. 2 shows an arrangement of essential part of a typical optical unit for use with the barcode scanner according to the present invention.

As shown in FIG. 2, the optical unit 100 includes light source 110, light collecting mirror 120 having, at a center thereof, reflection mirror 130 as a plane mirror part, polygon mirror 140, and fixed mirror group 150, and light receiving part 160. This arrangement is merely one typical example of an optical unit. In addition, a size of each element is relatively exaggerated for description purposes. The optical unit 100 for use with the barcode scanner 10 of the present invention may broadly include, in addition to this structure, those optical units which emit a beam and scan a barcode; for instance, an optical unit which emits a beam from a polygon mirror directly onto a barcode without intervening fixed mirror group, and an optical unit which emits a beam from a light source to a polygon mirror without intervening a reflection mirror. In general, if there are provided a plurality of optical units 100, a plurality of stages 200 and inclination apparatuses 300 are provided accordingly.

The light source 110 generates a laser beam or infrared ray (simply refereed to as "beam" hereinafter) and emits it toward (the reflection mirror 130 provided at the center of) the light collecting mirror 120. The light source 110 may utilize a semiconductor laser, e.g., a He—Ne laser tube. The light source 110 is driven light control circuit 112 shown in FIG. 1 that controls turning on/off of the beam. The light control circuit 112 is connected to and controlled by the CPU 400. A solid line arrow in FIG. 2 indicates a beam emitted from the light source 110.

The light collecting mirror 120 has a concave mirror shape having circle window 122 at a center thereof. The reflection mirror 130 is set as a plane mirror at the circle window 122. The light collecting mirror 120 is made of one resin molded product including concave mirror 124 and the reflection mirror 130. Of course, the reflection mirror 130 may be made as a different member independent of the light collecting mirror 120.

In this embodiment, the concave mirror 124 in the light collecting mirror 120 receives light which includes barcode data and has been reflected from the polygon mirror 140, stops it down to a predetermined spot diameter, and reflects it to the light receiving part 160. A broken line arrow from the light collecting mirror 120 to the light receiving part 160 in FIG. 2 indicates the reflected light. Optionally, the light collecting mirror 120 may be substituted for by a collimeter lens having the similar functions (or a combination of the collimeter lens and a cylindrical lens etc.).

The reflection mirror 130 in the light collecting mirror 120 reflects a beam emitted from the light source 110 to the polygon mirror 140. Optionally, the reflection mirror 130 may serve to reflect light reflected from the polygon mirror to the light receiving part 160.

Figure 3:
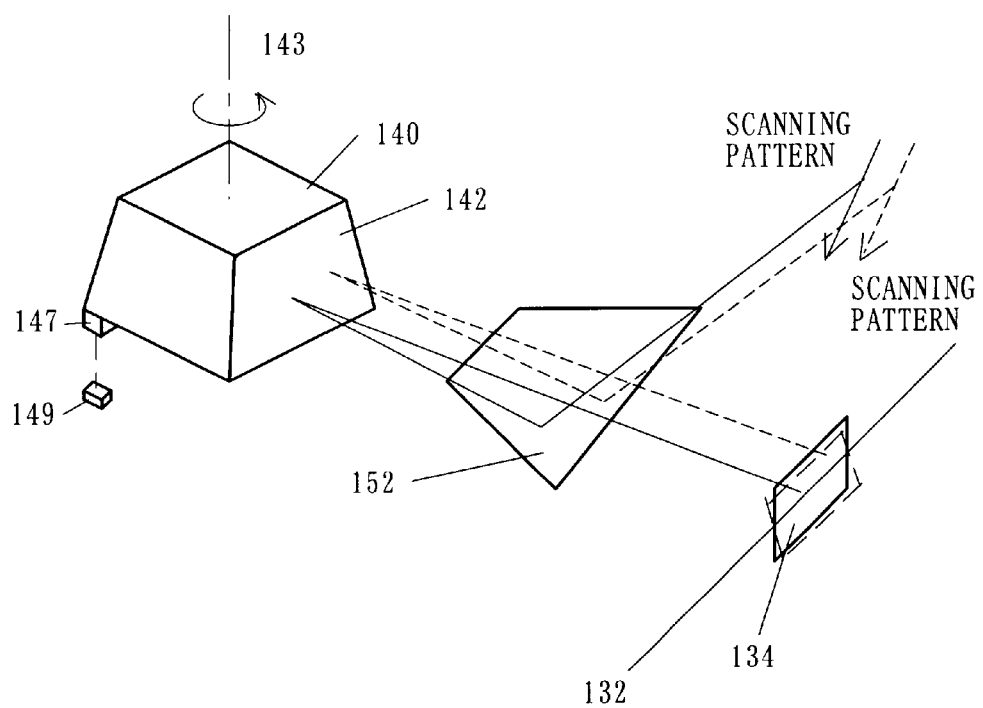
FIG. 3 is a perspective view of essential part of a modified example of a reflection mirror of the optical unit shown in FIG. 2.

Optionally, as shown in FIG. 3, the reflection mirror 130 may be comprised of swing mirror 134 which is swingable around shaft 132 orthogonal to a rotational axis 143 of the polygon mirror 140 which will be described later. Swing of the reflection mirror 130 (134) generates a plurality of scanning patterns which are mutually shifted, improving the reading precision. The shift width of the scanning pattern is set to a value at least higher than the value (7 mm) defined in the laser safety standards, and it is designed that the shifted scanning patterns never go into operator's pupil(s).

As shown in FIGS. 1 through 5, the polygon mirror 140 has a plurality of reflection surfaces 142 and rotational axis 143, and is connected to a motor 144 that rotates the polygon mirror 140. The motor 144 is connected to angle detecting device 146 which detects a rotational angle of a motor shaft (not shown) of the motor 144, and motor driving circuit 148 which drives the motor 144. Optionally, magnet 147 and hole element 149 are provided to detect a home position (i.e., reference position) of the polygon mirror 140. Either the magnet 147 or the hole element 149 rotates with the polygon mirror 140, whereas the other stands still with the stage 200.

The polygon mirror 140 reflects beam light reflected from the reflection mirror 130 to the fixed mirror group 150, and reflects light including the barcode data reflected from the fixed mirror group 150 to the reflection mirror 130. The desired number of reflection surfaces 142 may be provided, and each reflection surface 142 has a different inclination in the instant embodiment. For example, the polygon mirror 140 is formed as a square pillar for four reflection surfaces 142, and a pentagonal pillar for five reflection surfaces 142. The motor shaft (not shown) of the motor 144 is the same shaft as the rotational axis 143 of the polygon mirror 140, and the polygon mirror 140 (or the respective reflection surfaces 142) rotates around the rotational axis 143.

The angle detecting device 146 and the motor driving circuit 148 are connected to and controlled by the CPU 400. Any angle detecting means (for instance, a potentiometer) that has been known in the art is applicable to the angle detecting device 146.

Figure 4:
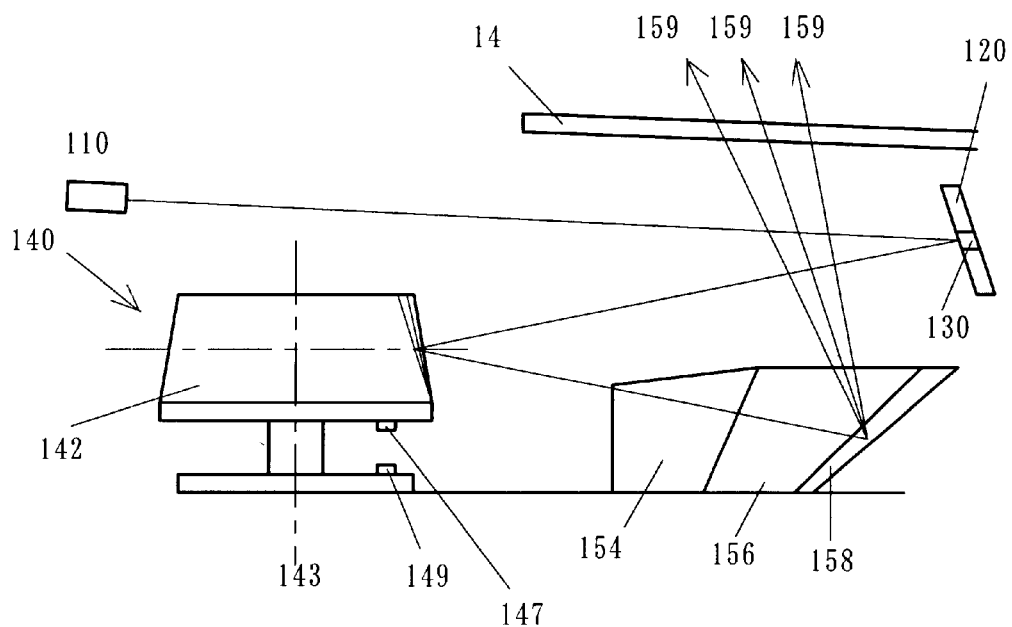
FIG. 4 is a side view of essential part of arrangement between a polygon mirror and a fixed mirror group in the optical unit shown in FIG. 2.
Figure 5:
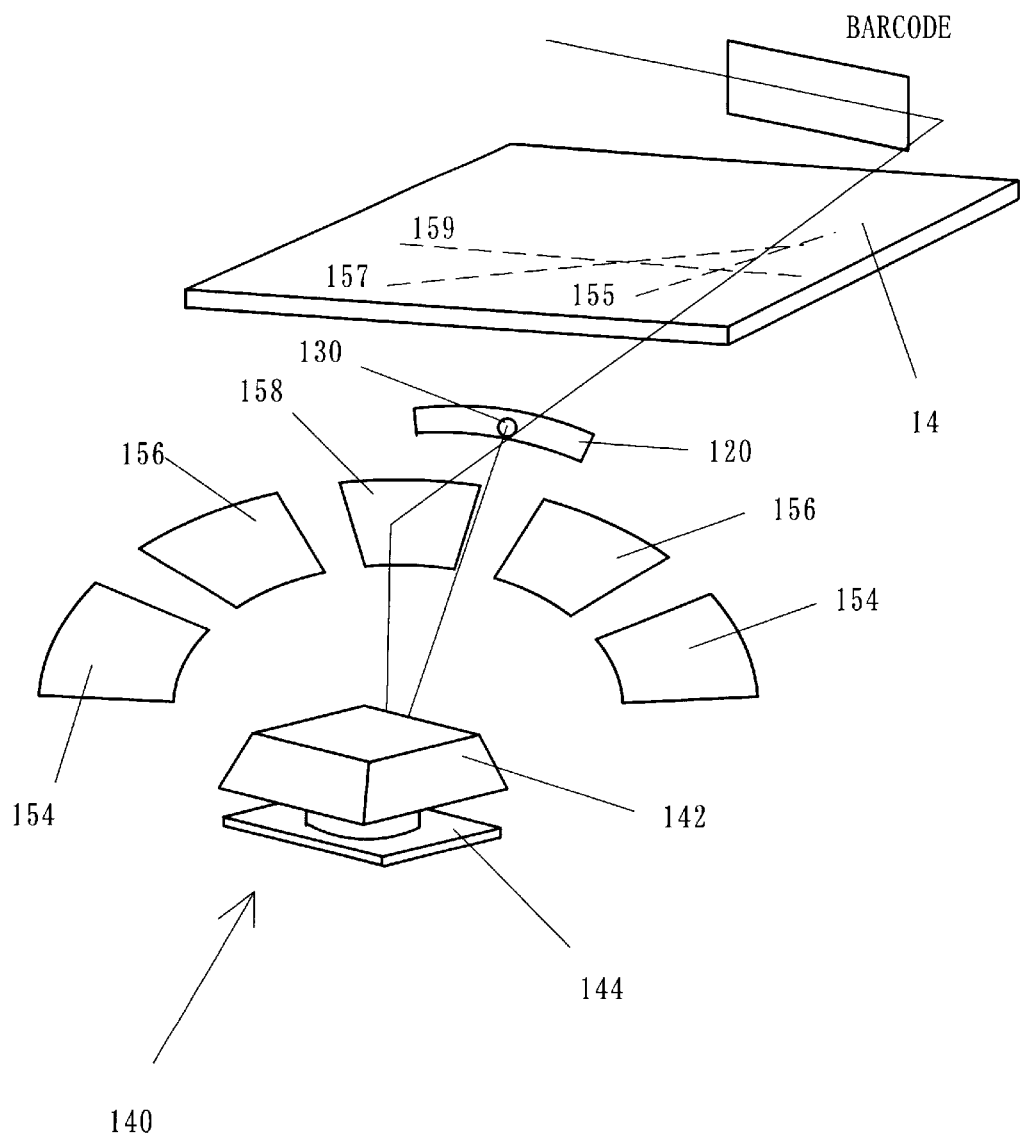
FIG. 5 is a perspective view of essential part of arrangement between a polygon mirror and a fixed mirror group in the optical unit shown in FIG. 2.

The fixed mirror group 150 includes a plurality of (e.g., five) stationary mirrors (or also called "scan mirrors") 152. The fixed mirror group 150 emits, as a scanning pattern, a beam light reflected from the polygon mirror 140 through the read window 14 to a barcode so as to scan it, and reflects light reflected by the barcode to the polygon mirror 140. Since each reflection surface 142 of the polygon mirror 140 is inclined differently, one stationary mirror 152 emits a beam in a plurality of directions (for example, three directions for three inclined angles). When five stationary mirrors are used, as shown in FIGS. 2, 4 and 5, the stationary mirrors 152 include a pair of outermost V mirrors 154, a pair of H mirrors 156 adjacent to the V mirrors 154, and one center Z mirror 158. Beams reflected by these stationary mirrors 152 form a scanning pattern including V pattern 155, H pattern, and Z pattern 159 above the read window 14. Radiation of this scanning pattern onto a barcode above the read window 14 results in the reflected light including the barcode data.

The light receiving part 160 includes light receiving element 162 such as a pin photodiode, etc., and A/D converter part 164. The light receiving element 162 receives light reflected from a barcode through the reflection mirror 130 which proceeds reverse to the beam and includes the barcode data, converts it into an analog signal, and then sends it to the A/D converter part 164. The A/D converter part 164, connected to the CPU 400, converts the analog signal to a digital signal, and sends it to the CPU 400.

A simulation has been previously conducted for the optical unit 400 before the unit is shipped so that optical noises become minimum and the light amount of the scanning pattern meet the laser safety standards (such as IEC and CDRH). Therefore, the optical unit 10 may generate a scanning pattern which always has an optimal reading precision and secures safety irrespective of the installation and usage environments.

The optical unit 100 is fixed onto the stage 200 which has a plate shape or any other arbitrary shape. The stage 200 is made of materials which have strength sufficient to support the optical unit 100 (such as an iron plate). The stage 200 does not have to mount all the elements of the optical unit 100, and may mount only a minimum optical system necessary to emit a scan beam (e.g., the light source 110, light collecting mirror 120, reflection mirror 130, polygon mirror 140, and fixed mirror group 150). Optionally, the stage 200 mounts such an optical system to receives reflected light of a scan beam (such as the light receiving element 162). In any event, the stage 200 need not mount the light control circuit 112, angle detecting device 146, and motor driving circuit 148, and A/D converter part 164. Here, "a minimum optical system necessary to emit a scan beam" means an optical system which may maintain an optimal scanning pattern preset when the product is shipped. Therefore, it does not include inclination that breaks the preset optimal scanning pattern, for example, by independently inclining only the stationary mirror 130. However, for example, in case of using a one-dimensional inclination mechanism which maintains an optical axis of a beam from the light source 110, the light source 110 may be theoretically excluded from the stage 200. As far as the light reflected from a barcode can be read, the light receiving element 162 may be removed from the stage 200. If an element of the optical unit changes, for example, if a collimeter lens is used rather than the light collecting mirror 120, "a minimum optical system necessary to emit a scan beam" must also change accordingly. Incidentally, the stage 200 may be processed so that it has part or all of the functions of the inclination apparatus 300 which will be described below.

The inclination apparatus 300 is mechanically connected to the stage 200, and compatible with various types of inclinations, such as a one-dimensional inclination, two-dimensional inclination, manual inclination, and automatic inclination. The automatic inclination by the CPU 400 will be described later with reference to FIG. 17. The inclination apparatus 300 includes inclination mechanism 302 which inclines the stage 200, and securing mechanism 304 which secures the stage 200 at a predetermined inclined angle. Optionally, the inclination apparatus 300 further includes returning device 306 which returns the stage 200 to the horizontal state, and display 308 which notifies an operator of a direction and amount of the inclination. In the following description, the inclination apparatus 300 generalizes reference numerals 300a, 300b, etc., that are assigned to inclination apparatuses in the different embodiments. This generalization applies to the inclination mechanism and other elements.

The inclination mechanism 302 may be a one-dimensional inclination mechanism that one-dimensionally inclines the stage 200, or a two-dimensional inclination mechanism that two-dimensionally inclines it. In the following description, the inclination mechanism 302 inclines the stage 200 by a mechanical action, but this does not exclude electric, magnetic and other actions. As described above, the inclination mechanism 302 may be inclined manually by an operator or automatically by the CPU 400, and the automatic inclination will be discussed with reference to FIG. 17.

The one-dimensional inclination mechanism is one that inclines the stage 200 around a rotational axis that extends in a predetermined direction. An operator can inclines the stage 200 directly or indirectly around the rotational axis by applying a moment to the rotational axis, the stage 200 or a member coupled with the stage 200. Therefore, the one-dimensional inclination mechanism generally includes such a rotational axis and moment application means. The one-dimensional inclination mechanism has various modifications by types of the rotational axis and the moment application means.

A description will now be given of a one-dimensional inclination mechanism in which a rotational axis is made by support shaft 310 coupled to the stage 200 and an operator applies a moment directly onto the support shaft 310 via direction indicator dial 312 coupled to the support shaft 310.

Figure 6:
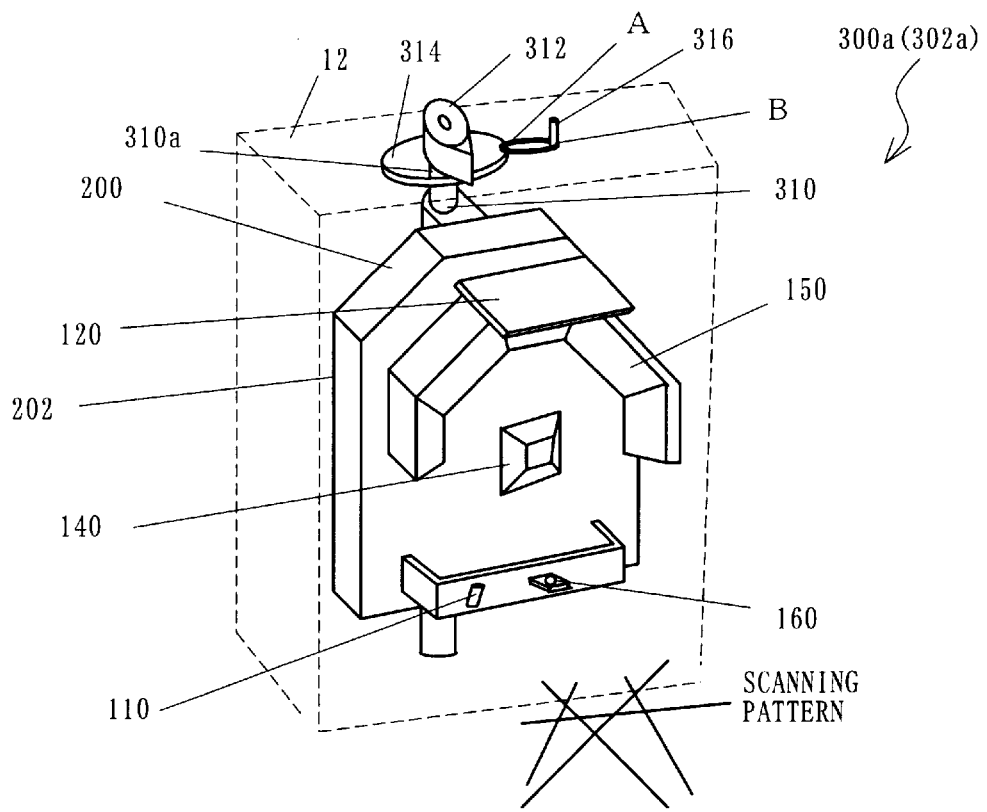
FIG. 6 is a transparent perspective view of essential part of one example of inclination apparatus of the barcode scanner shown in FIG. 1.

FIG. 6 shows exemplary inclination apparatus 300a having one-dimensional inclination mechanism 302a. As illustrated, the support shaft 310 as a rotational axis is connected to lower surface 202 of the stage 200 while separated from the lower surface 202 by a predetermined distance, and supported rotatable with the stage 200 with respect to the housing 12. A position and sectional shape of the support shaft 310 is not limited to those shown in FIG. 6. Therefore, the support shaft 310 may be connected to the stage 200 while penetrating almost the center of the stage 200 or may be connected to the bottom or side of the stage 200. In other words, the rotational axis may be positioned in the stage 200 or spaced from the stage 200.

Figure 7:
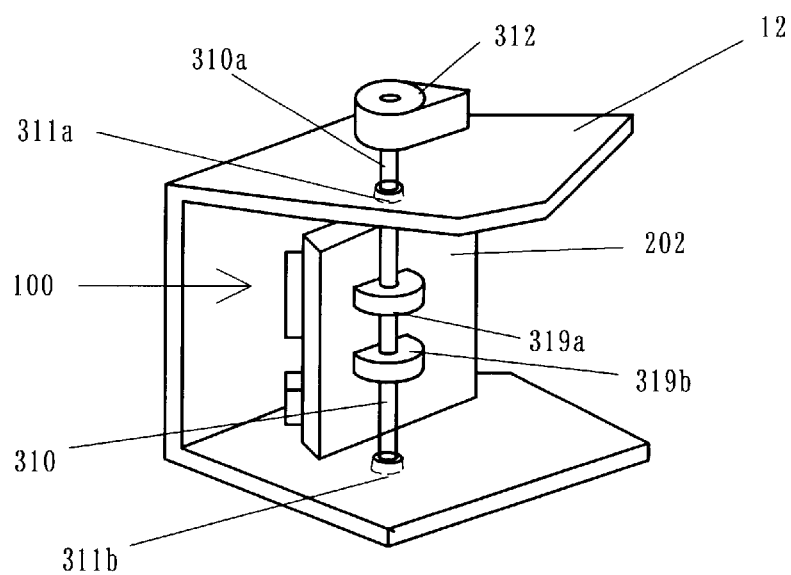
FIG. 7 is a partially sectional and perspective view showing essential part of exemplary connections that realize the inclination apparatus shown in FIG. 6.

FIG. 7 is an exemplary connection between the support shaft 310 and the stage 200 that realizes the inclination mechanism shown in FIG. 6. As illustrated, the support shaft 310 is attached rotatably to the housing 12 via a pair of bearings 311a and 311b, and a pair of levers 319a and 319b are secured onto the support shaft 310 between the bearings 311a and 311b. These levers 319a and 319b are secured onto the lower surface 202 of the stage 200. Therefore, the support shaft 310 is able to rotate together with the stage 200 via the levers 319a and 319b with respect to the housing 12. For purpose of illustrations, gear 314 in FIG. 6 which will be described later and other elements are omitted in FIG. 7. Similarly, the bearings 311a and 311b and the like are omitted in FIG. 6.

Any bearing known in the art (for example, a ball bearing) is applicable to the bearings 311a and 311b.

Although FIG. 7 shows that each of the levers 319a and 319b has a semi-cylindrical shape having a predetermined width along the support shaft 310, the shape thereof is not limited to it. Any desired shape may be selected in accordance with the interval to be spaced between the support shaft 310 and the stage 200, and other conditions. The predetermined width is set by taking into account the strength necessary for achieving stable inclining actions between the support shaft 310 and the stage 200. Therefore, levers 319a and 319b may be made of members having different shapes and sizes. The number and positions of levers are not limited to those shown in FIG. 7. The lever may be part of the stage 200, instead of forming an independent member.

As shown in FIGS. 6 and 7, the support shaft 310 penetrates the housing 12 at both ends thereof, and one end protrudes as protrusion 310a from the housing 12 and engaged with the direction indicator dial 312. The direction indicator dial 312 has any shape as far as it can surely function to indicate an inclined angle as stated below. In FIGS. 6 and 7, the direction indicator dial 312 has a sectional shape of a combination of a circle and a triangle.

Figure 8:
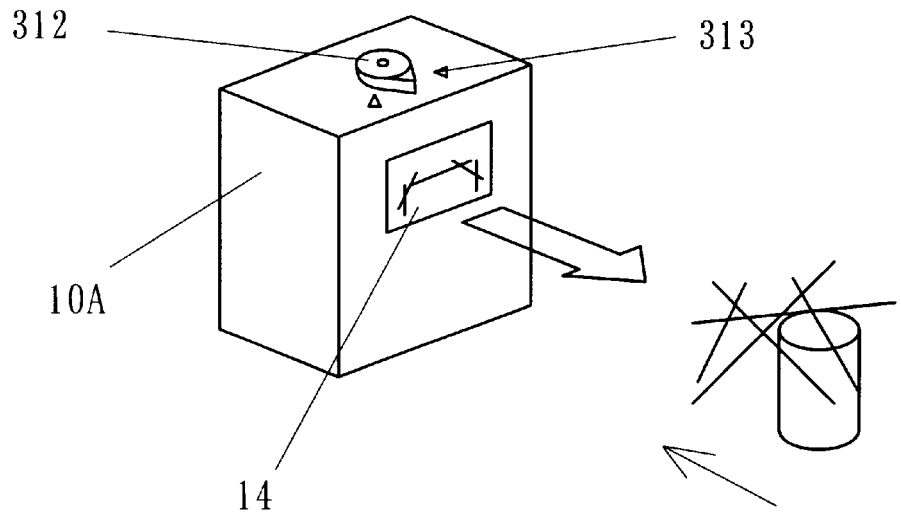
FIG. 8 is a perspective view for explaining an effect of the barcode scanner shown in FIG. 6.

In the initial state, the stage is set to be "no inclination" (horizontal), and the direction indicator dial 312 indicates 0° in scale 313 provided on the housing 12. The scale 313 is omitted in FIGS. 6 and 7. Exemplary scale 313 is shown in FIG. 8. The scale 313 may be cut every five degrees, for example, and produced by a desired method. Alternatively, if a more precise angle is required to be indicated, a display that electrically responds to a rotation of the direction indicator dial 312 may be provided in addition to or instead of the scale 313.

An operator may incline the stage 200 by an arbitrary angle by rotating the direction indicator dial 312. When the stage 200 is inclined, the direction indicator dial 312 indicates the inclined angle on the scale 313.

The inclination apparatus 300a shown in FIG. 6 includes securing mechanism 304a that holds the stage 200 at the initial state and the inclined state after inclination. The securing mechanism 304a may secure the stage 200 by any known method. For example, referring to FIG. 6, the securing mechanism 304a may be comprised of gear 314 which is connected coaxially to and rotatable with the support shaft 310, and lock pin 316 which is connected to the housing 12 and movable between lock position A and retreat position B in hole 317 in the housing 12. When the lock pin 316 is located at the retreat position B, an operator can rotate the direction indicator dial 312. When the lock pin 316 is moved to the lock position A and engaged with the gear 314, it can secure the gear 314, thereby securing the support shaft 310 and the stage 200 at that inclination. In an attempt to secure a stable operation by setting as a normal state the lock state of the stage 200, the lock pin 316 may be forced to the lock position A by a spring member etc. In this case, the operator moves the lock pin 316 to the retreat position B before inclining the stage 200.

If the stage 200 needs to be returned to the initial state (horizontal state) after the lock pin 316 is released from fixation, a spring member (not shown) may be provided as return device 306a. One end of the spring member is fixed onto the bottom of the housing 12 and the other end is connected to the lower surface 202 of the stage 200.

The scale 313 provided at the side of the housing 12 and the direction indicator dial 312 serve as the display 308 of the inclination apparatus 300a. An operator may always obtain optimal operations by memorizing the inclined angle and using it for the next setting.

Figure 9:
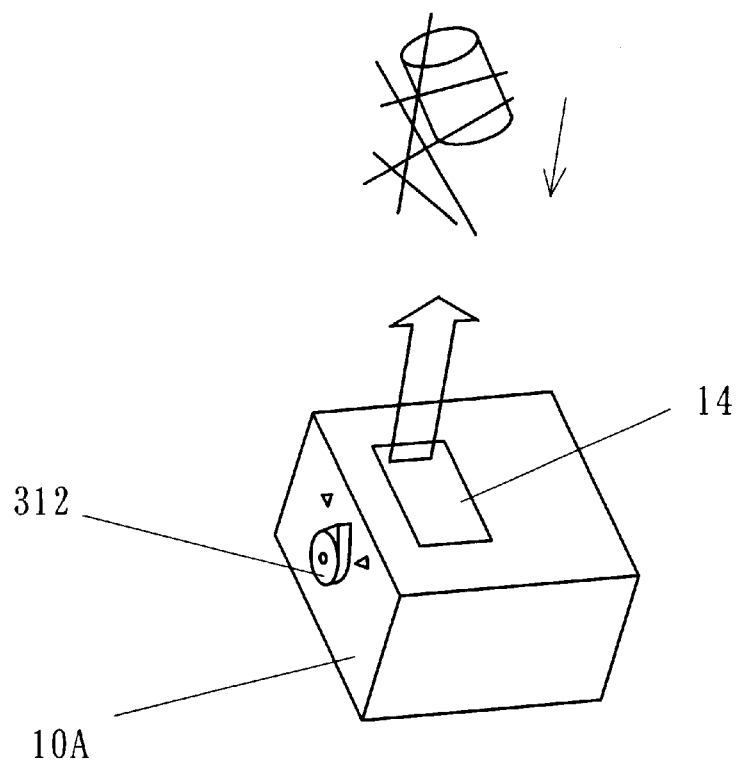
FIG. 9 is a perspective view for explaining another effect of the barcode scanner shown in FIG. 6.

The barcode scanner 10A shown in FIG. 6 may be used as a longitudinal type, as shown in FIG. 8, or as a lateral type as shown in FIG. 9, for example. An operator can obtain an inclined angle of the stage 200 optimal to him/her by simply adjusting the direction indicator dial 312, irrespective of his/her height and experience. Therefore, the barcode scanner 10A shown in FIGS. 6 and 7 may change a pattern emitting direction in accordance with the installation and usage environments while maintaining the optimal pattern preinstalled at the time of shipping.

Figure 10:
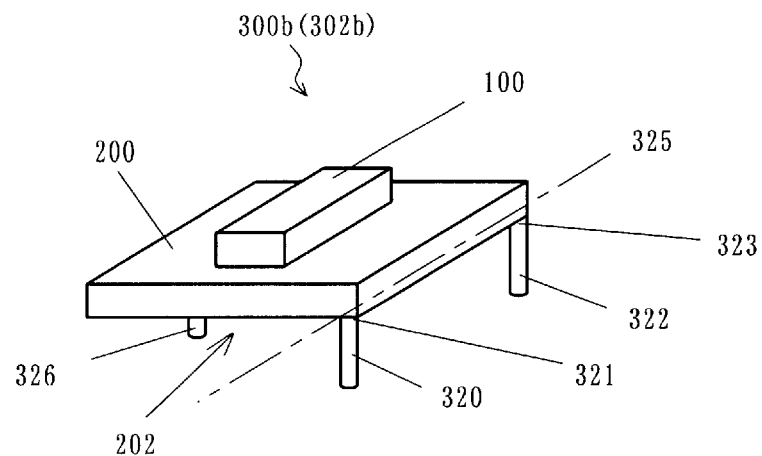
FIG. 10 is a schematic perspective view of a modified example of the inclination apparatus shown in FIG. 6.

Referring to FIG. 6, although the rotational axis is made of the support shaft 310 which is an independent member, it is not necessary to constitute the rotational axis by an independent member when the stiffness of the stage 200 is utilized. For example, FIG. 10 schematically shows inclination apparatus 300b having one-dimensional inclination mechanism 302b. In the inclination mechanism 302a, one end of each of two support shafts 320 and 322 is fixed onto the bottom of the housing 12 and the other end thereof is rotatably attached to the lower surface 202 of the stage 200 by a hinge (not shown). A rotational axis corresponds to straight line 325 that connects joint 321 between the support shaft 320 and the stage 200 to joint 323 between the support shaft 322 and the stage 200. Thus, the inclination mechanism 302b does not include a rotational axis as an independent member. The support shafts 320 and 322 do not have to stand perpendicular to the stage 200. The stage 200 is inclinable around the straight line 325 by moving up and down operating shaft 326 that is connected to the stage 200 apart from the straight line 325.

The support shaft 310 serving as a rotational axis is a member independent of the stage 200 in FIG. 6. However, another (not shown) one-dimensional inclination mechanism may be adopted by processing part of the stage 200 into a pair of protrusions, and protruding these protrusions from the housing 12 to serve as a rotational axis. In this case, the one-dimensional inclination mechanism does not contain a rotational axis as an independent member, but the stage 200 has this function instead.

The moment application means is not limited to the direction indicator dial 312 that directly applies a moment to the support shaft 310. For example, rather than the direction indicator dial 312, if operating shaft 328 is coupled to the stage 200 parallel to the support shaft 310, as in inclination apparatus 300c in FIG. 11, an operator may apply a moment to the stage 200 around the support shaft 310 by moving up and down in the drawing the operating shaft 328 which protrudes from the housing 12. This case is similar to that of FIG. 6, in that the stage 200 is rotatable around the support shaft 310, but it is different from FIG. 6 in that the support shaft 310 does not necessarily have the end 310a which protrudes from the housing 12. The hole 16 in the housing 12 in which the operating shaft 328 moves would be formed as an arc, but could have a different shape as the shape of the operating shaft 328 changes. Needless to say, a position of the operating shaft 328 is not limited to that illustrated.

Figure 11:
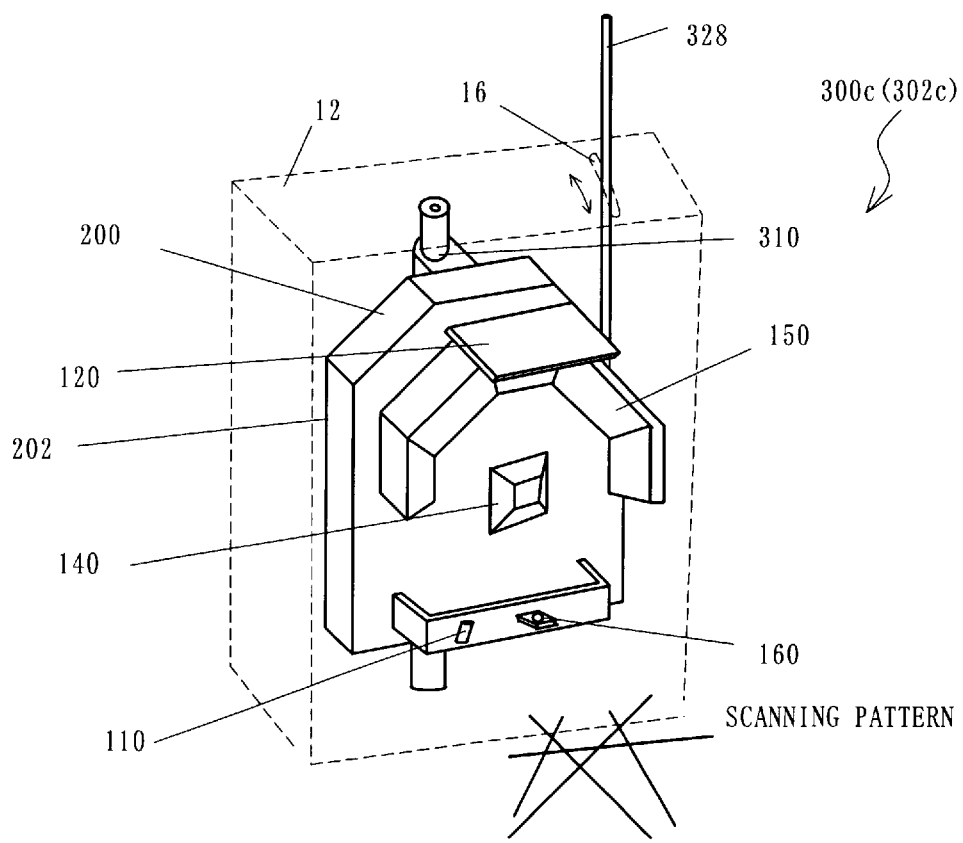
FIG. 11 is a transparent perspective view of essential part of another modified example of the inclination apparatus shown in FIG. 6.

Although the operating shaft 328 is a member independent of the stage 200 in FIG. 11, it is possible to process part of the stage 200 into a protrusion, and protrude the protrusion from the hole 16 in the housing 12, making this serve as the operating shaft 328. Therefore, in this case, the one-dimensional inclination mechanism does not include the moment application means, but the stage 200 has this function instead.

Figure 12:
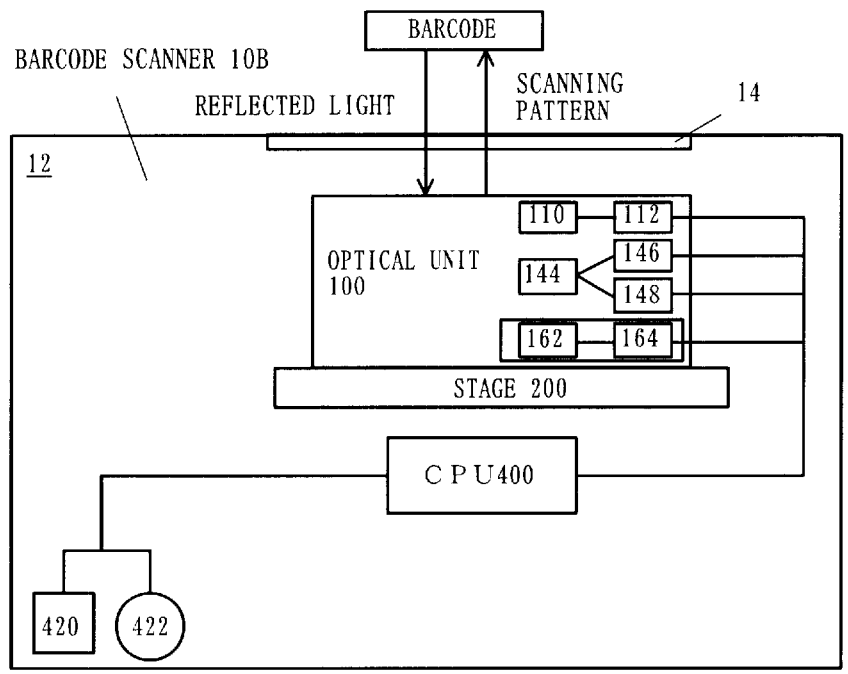
FIG. 12 is a block diagram showing a principle of a barcode scanner of a second embodiment according to the present invention.
Figure 18:
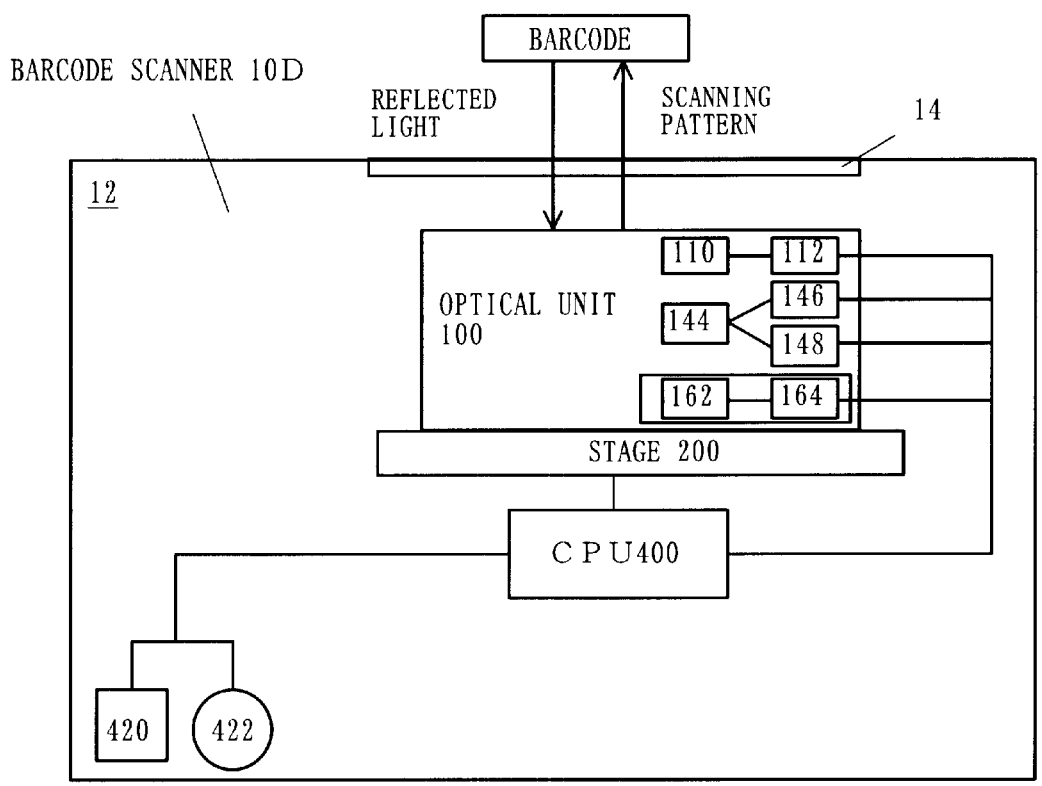
FIG. 18 is a block diagram showing a principle of a barcode scanner of a fourth embodiment according to the present invention.

If the stage 200 has the functions of the rotational axis and the moment application means, the stage 200 may additionally have functions of the securing mechanism, returning device, display, omitting inclination device 300 in FIG. 1. Such barcode scanner 10B is shown in FIG. 12. FIG. 18 shows a case where the CPU 400 automatically controls such stage 200.

Figure 13:
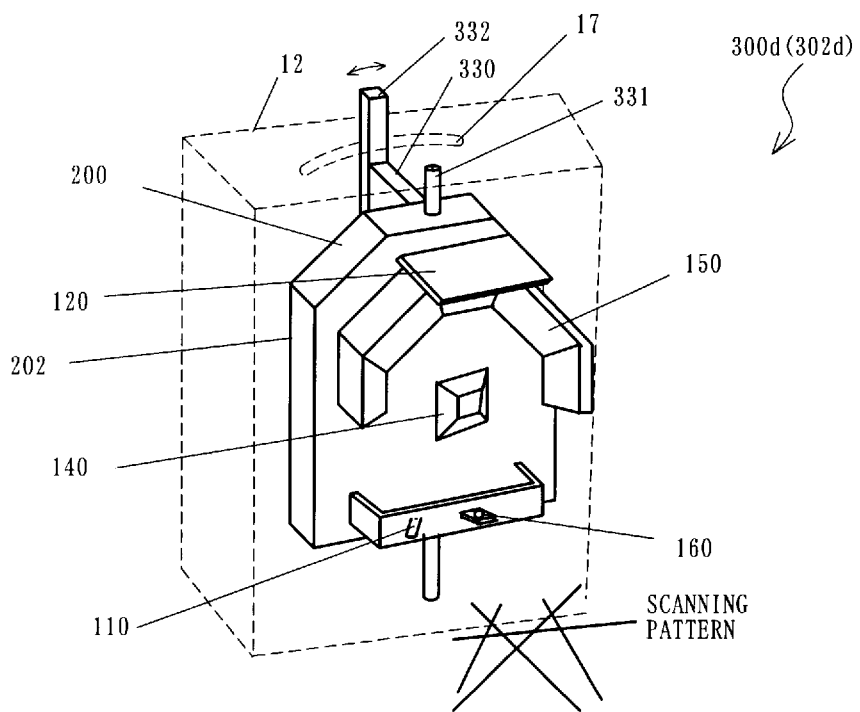
FIG. 13 is a transparent perspective view of essential part showing still another modified example of the inclination apparatus shown in FIG. 6.

FIG. 13 shows inclination apparatus 300d having another one-dimensional inclination mechanism 302d. The inclination mechanism 302d includes plate support member 330 which is engaged with the lower surface 202 of the stage 200 at one end thereof, support shaft 331 as a rotational axis which penetrates through the stage 200, and operating shaft 332 which is attached to the other end of the support member 330.

The support shaft 331 is fixed onto the stage 200, and supported rotatably by the housing 12. The operating shaft 332 penetrates outside the housing 12 through arc 17 that is formed in the housing 12. An operator may apply a moment to the support member 330 and the stage 200 by moving right and left in the drawing the operating shaft 332. In this embodiment, the operating shaft 332 is spaced from the support shaft 331 of the stage 200 by a predetermined distance.

The support member 330 and the operating shaft 332 may be integrated into one member. The support member 330 is not limited to a plate-shaped member, but may be formed as an L-shaped rod so as to serve as the operating shaft 332, omitting the operating shaft 332. As stated, the stage 200 may have one or both of these functions. Processing part of the stage 200 may make the support shaft 331. A position and shape of the support shaft 331 are not limited to those shown in FIG. 13, similar to the above embodiments.

The one-dimensional inclination mechanism may thus use, but is not limited to, many of the above structures. A description will now be given of the inclination mechanism 302 as a two-dimensional inclination mechanism.

The two-dimensional inclination mechanism is one which broadly inclines the stage 200 two-dimensionally, but is not limited to two orthogonal axes. It is similar to the one-dimensional inclination mechanism in that an operator inclines the stage directly or indirectly by applying a moment to the stage 200 via an operating point that is located outside the housing 12.

A description will now be given of inclination apparatus 300e having two-dimensional inclination mechanism 302e which inclines the stage 200a in two axes, with reference to FIGS. 14 and 15. The inclination mechanism 302e includes support shafts 340 and 342, stage 344, different from the stage 200a, which mounts the optical unit 100, direction indicator dial 346 engaged with the support shaft 340, direction indicator dial 348 engaged with the support shaft 342, hinge 350 which engages the stage 200a with the stage 344, spring member 352, and cam 354.

The support shaft 340 is coupled to the lower surface of the stage 344 by securing members 356 and 358. As far as the support shaft 340 rotates together with the stage 344, an arbitrary position and structure may be selected for the securing members 356 and 358. For example, the securing members 356 and 358 may be comprised of the levers 319a and 319b, as shown in FIG. 7.

The stage 344 is coupled to the stage 200a by the hinge 350. As the support shaft 340 rotates, the stage 344 that is integrated with it rotates together. The stage 200a also rotates with the stage 344 around the support shaft 340 since the hinge 350 connects the stage 200a with the stage 344 while prohibiting them from relatively rotating in a rotating direction of the support shaft 340. Thereby, an operator may incline the stage 200a around the support shaft 340 by twisting the direction indicator dial 346.

Figure 15:
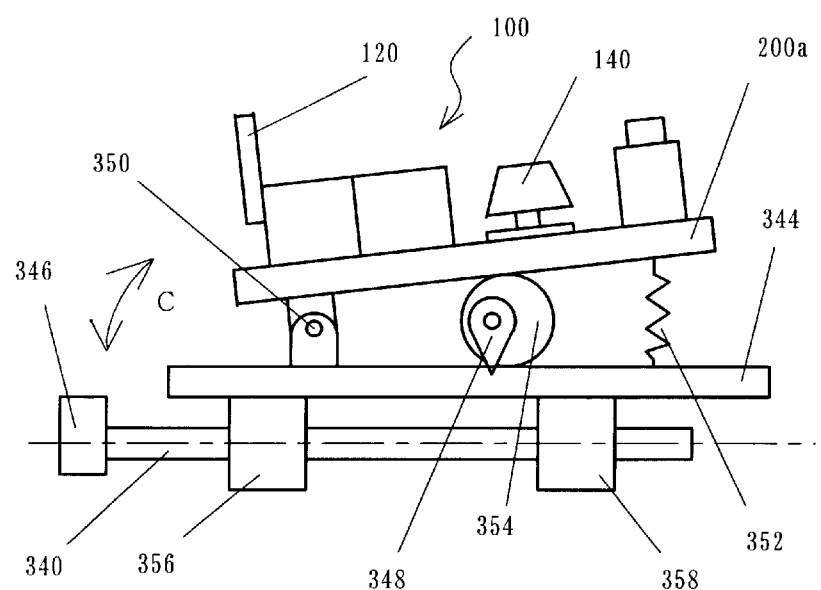
FIG. 15 is a side view of the inclination apparatus shown in FIG. 14.

The stage 200a is rotatable relative to the stage 344 by the hinge 350 (in direction C in FIG. 15). The direction C is orthogonal to a rotatable direction of the support shaft 346. The stage 200a is forced clockwise by the spring member 352.

The support shaft 342 is connected to a top surface of the stage 344 by a securing member (not shown) similar to the securing members 356 and 358. The cam 354 is coupled to and rotated with the support shaft 342. The cam 354 is located between the hinge 350 and the spring member 352, and contacts the lower surface 202 of the stage 200a. As far as the cam 354 inclines the stage 200a when rotating with the support shaft 342, by a different height which corresponds to the rotational angle, its shape is not limited to the illustrated one. The cam 354 is formed as a cylindrical shape and the support shaft 342 is shifted from the center of the cylinder in FIG. 15, but it is apparent that the cam 354 may have a shape similar to the direction indicator dial 348. Thereby, the operator may incline the stage 200a around the hinge 350 by a height corresponding to the rotational angle by twisting the direction indicator dial 348 and rotating the support shaft 342 and the cam 350.

Figure 14:
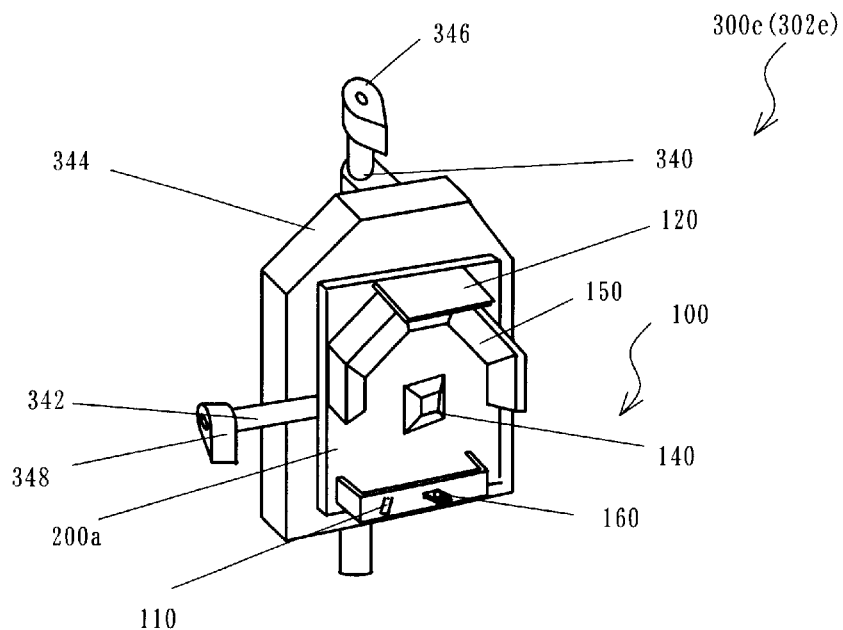
FIG. 14 is a perspective view of essential part showing another example of the inclination apparatus of the barcode scanner shown in FIG. 1.

Securing mechanism 304e, returning device 306e, and display 308e of the inclination apparatus 300e shown in FIGS. 14 and 15 may utilize those shown in FIG. 6, and a description thereof will be omitted. The spring member 352 serves as the returning device around the support shaft 342.

Figure 16:
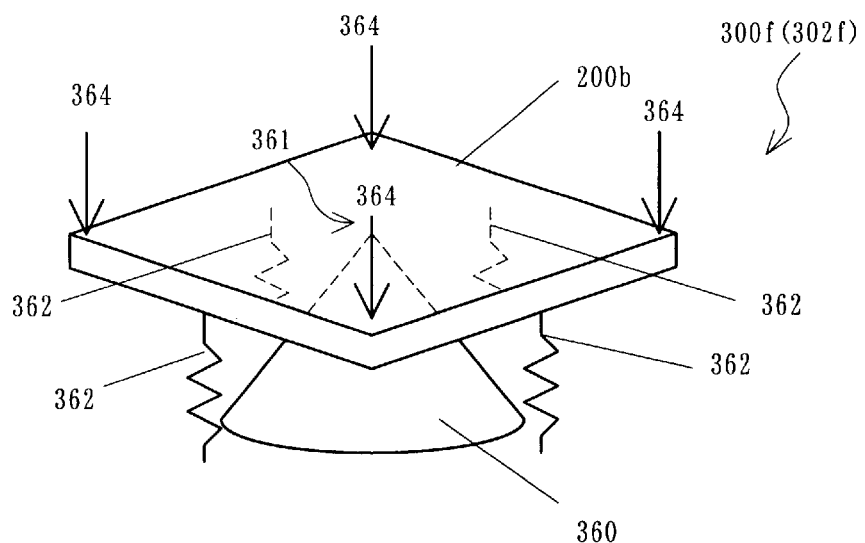
FIG. 16 is a schematic perspective view of a modified example of the inclination apparatus shown in FIG. 14.

Next follows a description of a two-dimensional inclination mechanism that broadly two-dimensionally inclines the stage 200. First, a description will now be given of inclination apparatus 300f having two-dimensional inclination mechanism 302f of the present invention, with reference to FIG. 16. FIG. 16 schematically shows the inclination mechanism 302f, omitting the optical unit 100. The inclination mechanism 302f includes support member 360 located beneath the centroid of the stage 200b, spring members 362 which keep the stage 200b horizontal, and compression means 364 which apply forces onto the stage 200b from the top of the stage 200b. In FIG. 16, the two-dimensional inclination mechanism 302f has four spring members 362 and four compression means 364.

As far as the support member 360 properly serves as a fulcrum of inclination for the stage 200b, it has an arbitrary shape. Referring to FIG. 16, a dent (not shown) is formed at the bottom of the stage 200b and the support member 360 has a conical shape having top 361 that is processed round so as to be partially engageable with the dent of the stage 200b. Alternatively, the support member 360 may have a polygon pyramid or a sphere shape.

Each spring member 362 is connected to the bottom of the housing 12 at one end thereof, and the lower surface 202 of the stage 202b at the other end thereof. The spring member 362 is adjusted so that no spring force applies to the stage 200b at a horizontal state (initial state). The number and positions of springs are determined in accordance with the number and positions of compression means 364 so that the stage 202b becomes stable. Therefore, the spring member 362 may be provided below the compression means 364. Alternatively, an elastic member other than the spring member 362 may be provided under the stage 200b, for example, an elastic sponge that envelops the support member 360 under the stage 200b.

The compression means 364 apply compression or tension forces to corners of the stage 200b, and may adopt any structure. It is not necessary to provide four spots as shown in FIG. 16. The compression means 364 is made, for example, by a link that is connected to the stage 200b through a hinge. Referring to FIG. 16, working one or more compression means 364 would apply a moment around the top 361 of the support member 360. For example, when the compression means 364 is made of a link, any method known in the art can be applicable to secure the link and indicate the moving amount. The spring member 362 serves as the returning device.

A description will now be given of the CPU 400 shown in FIG. 1. The CPU 400 is connected to the A/D converter part 164 of the optical unit 100, the light control circuit 112, the angle detecting device 146, and the motor drive circuit 148. The CPU 400 is also connected to the interface part 410, the display part 420, the speaker 422, and an external power source (not shown).

The CPU 400 includes a ROM, a RAM, a timer, an I/O controller, etc. (not shown), and runs based on a program stored in the ROM or RAM.

The CPU 400 controls the light control circuit 112 by a method known in the art. The CPU 400 can control each element so that it may enter an energy-saving mode when the timer (not shown) detects that the barcode scanner 10 has not been used for a long time.

The CPU 400 sends an angle signal to the angle detecting device 146 and the motor drive circuit 148, thereby controlling a rotational angle of the motor 144 (and the reflection surfaces 142 of the polygon mirror 140).

The CPU 400 receives a digital signal from the A/D converter part 164 of the light receiving part 160 and recognizes the barcode data. A barcode is recognized from data written down its top, middle, and end in a predetermined format. The CPU 400 judges that the data is valid when recognizing that the received digital data includes all of these data, and sends the data to a POS terminal via the interface part 410. Simultaneously, the CPU 400 may switch on and off the green light on the display 420, and beeps from the speaker 422, notifying an operator that the data has been validly recognized.

On the other hand, the CPU 400 judges that the data is invalid when it could recognize only part of the data or when the data did not comply with the predetermined format. The CPU 400 then switches on and off the red light on the display 420, and optionally gives an alarm sound from the speaker 422. Thus, the CPU 400 notifies the operator of the invalid reading and prompts him/her to do perform the reading over again. Incidentally, a description will be given later of control of the CPU 400 over the inclination apparatus 300 when the CPU 400 recognizes the part of barcode data.

Figure 17:
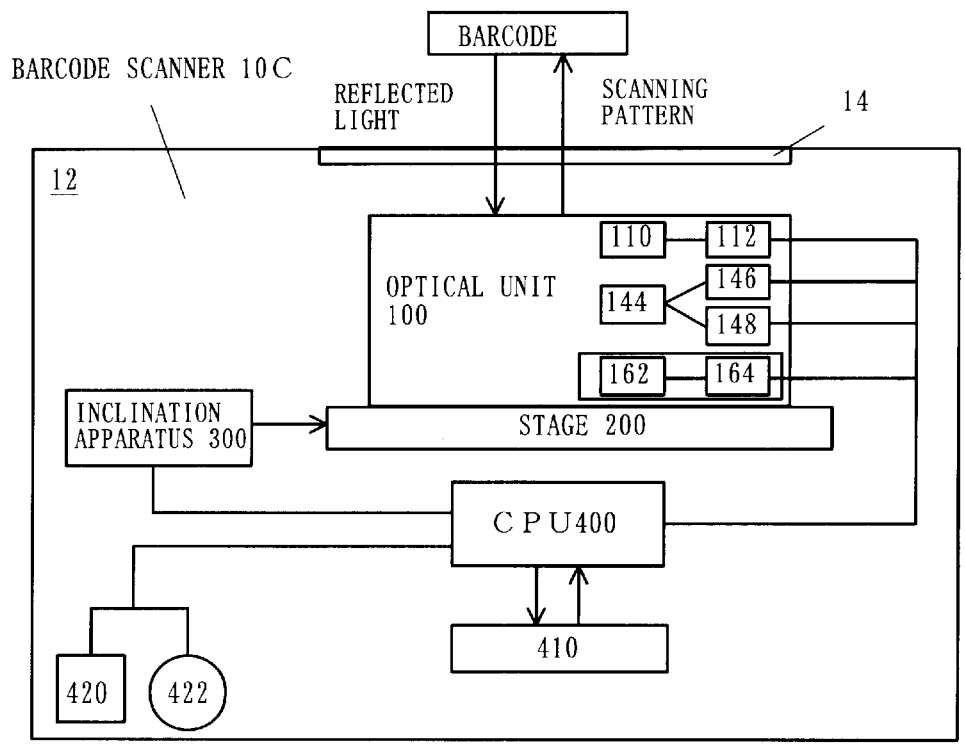
FIG. 17 is a block diagram showing a principle of a barcode scanner of a third embodiment according to the present invention.

Next follows a description of barcode scanner 10C in which the CPU 400 automatically controls the inclination apparatus 300, with reference to FIG. 17. In this case, the CPU 400 controls the inclination apparatus 300 based on the program stored in the ROM or RAM (not shown). As shown in FIG. 18, the CPU 400 may control the stage 200 when the stage 200 serves as the inclination apparatus 300, omitting the inclination apparatus 300. However, this case would be easily understood from the description of control of the CPU 400 over the inclination apparatus 300, and a description thereof will be omitted.

The CPU 400 in advance stores an optimal inclination angle for each operator in the ROM (not shown), and may control the inclination apparatus 300 based on it.

In this case, the CPU 400 obtains ID number data from the interface part 410 that the operator entered in the POS terminal, picks up inclined angle information corresponding to the ID from the ROM, and controls the inclination apparatus 300 based on that information. In this way, the operator may always obtain the optical unit 100 inclined at the optimal angle by simply entering his/her ID into the POS terminal.

When the CPU 400 does not store angle information for an operator, the CPU 400 conducts a simulation in accordance with a program stored in the ROM and detects the optimal angle information for the operator. There are several kinds of simulations, such as a method in which the operator repeats a trial reading, detects the optimal inclined angle, and enters it in the CPU 400, and a method in which the CPU 400 automatically detect the inclined angle and stores it. Moreover, even after the CPU 400 obtains the optimal inclined angle for a certain operator, it may update the optimal inclined angle periodically (for example, when the number of reading errors exceeds a predetermined times per unit time) or when the operator desires so by conducting over again the former method or the latter automatic detecting method. Optionally, the CPU 400 does not store an optimal inclined angle every operator and always performs an automatic detection by the latter method.

When an operator detects the optimal inclined angle and enters it into the CPU 400, the operator enters information of inclined direction that indicates whether a merchandise having a barcode moves from left to right or right to left viewed from the operator. Then, the operator makes the CPU 400 incline the stage 200 every predetermined angle (for example, five degrees) and enters the angle optimal to him/her into the CPU 400. Optionally, the CPU 400 may automatically detect and store the optimal inclined angle based on the reading success rate. When an operator enters the inclined angle, he/she may utilize the POS terminal or a keyboard etc. connected to the barcode scanner 10.

When the CPU 400 automatically detects an inclined angle, the CPU 400 may detect the optimal inclined angle by detecting a position of a stationary barcode or by detecting a path of a moving barcode. In either event, when information indicative of a moving direction of merchandise (i.e., whether it moves left to right or right to left) is entered previously, the CPU 400 would be able to detect the optimal inclined angle faster.

When the CPU 400 detects an inclined angle by detecting a position of a stationary barcode, an operator moves a barcode (or merchandise) to a reading area peculiar to him and stops the barcode there. There are several methods of detecting a position of the barcode.

First of all, there is a method in which the CPU 400 automatically and sequentially inclines the stage 200 by every predetermined angle (for example, five degrees) and detects an angle when it acquires light reflected from a barcode. In this case, the CPU 400 may adopt a two-stage searching method. The CPU 400 initially conducts a general search which uses a broad angle (for example, ten degrees) so as to roughly detect a barcode position, and the switches to a precise search when it detects part of the light reflected from the barcode, thereby detecting the precise position of the barcode.

Figure 19:
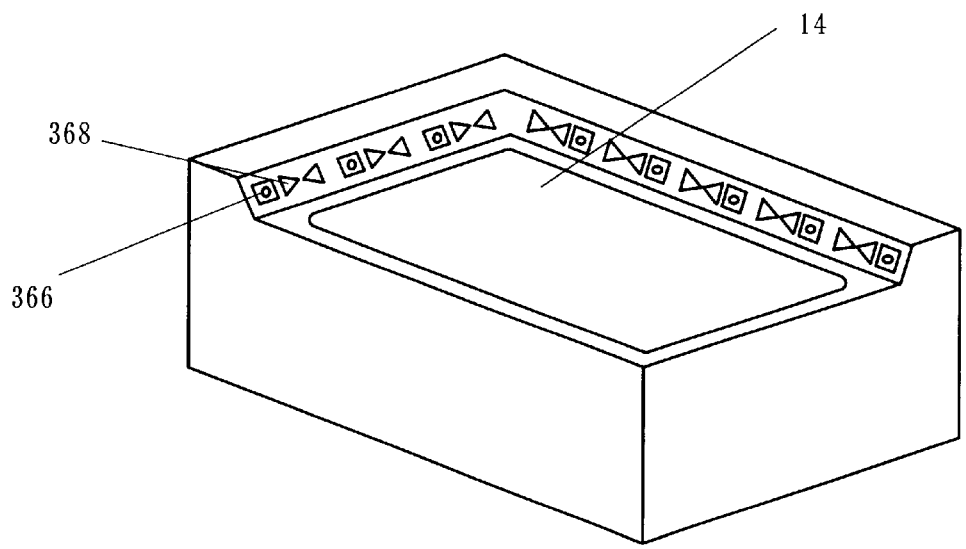
FIG. 19 is a perspective view of product detecting sensors applicable to the barcode scanners shown in FIGS. 17 and 18.

A sensor may detect a barcode position. For example, as shown in FIG. 19, the barcode scanner 10C has product detecting sensors 366 and indicator lamps 368 on the housing 12. Needless to say, positions and arrangements of the product detecting sensors 366 and the indicator lamps 368 are not limited to those shown in FIG. 19.

The product detecting sensors 366 are arranged in the longitudinal and lateral directions, covering the read window 14 at the top of the housing 12, and their outputs are connected to the CPU 400. The product detecting sensor 366 detects a shadow of merchandise and/or a barcode, and thereby detects its rough position. Any known sensor is applicable to the product detecting sensor 366. The CPU 400 controls inclination by the inclination apparatus 300 based on a detection signal of the product detecting sensors 366.

The indicator lamp 368 indicates a position of scanning pattern (or a reading area) emitted from the optical unit 100 on the inclined stage 200, and informs an operator of it. The indicator lamp 368 turns on in accordance with an instruction from the CPU 400. Thereby, an operator recognizes that a barcode should be approached to the reading area indicated by the indicator lamp 368.

Where the CPU 400 detects an optimal inclined angle by detecting a moving path of a barcode, an operator is required to move a barcode (or actually a merchandise) along his moving path once or several times. The CPU 400 may detect the barcode moving path based on the detection signal of the product detecting sensors 366, or it may detect the optimal inclined angle by making the inclination apparatus 300 incline the stage 200 randomly, and detecting the barcode moving path from the light reflected from the barcode at that time.

Figure 20:
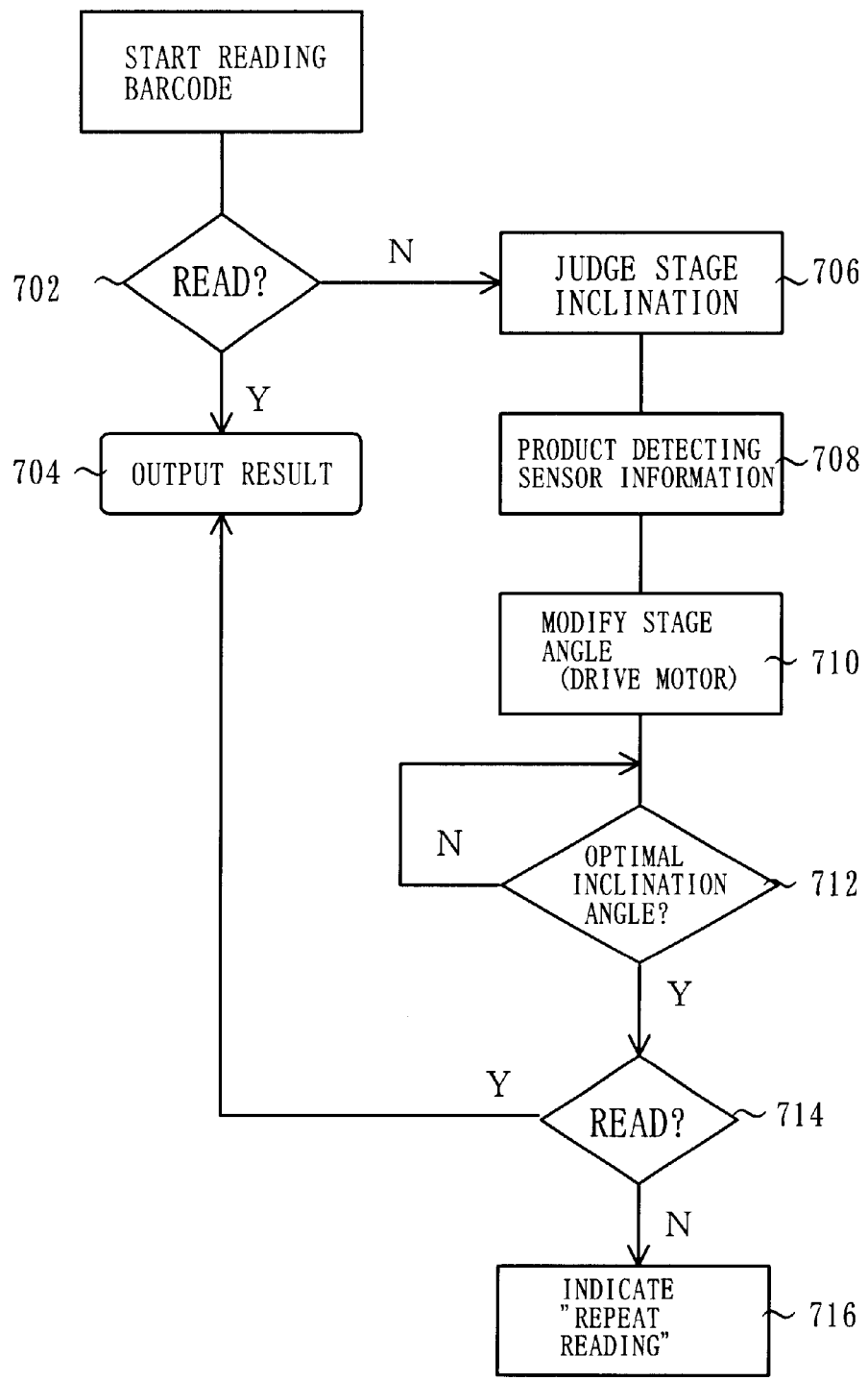
FIG. 20 is a flowchart of control procedures of a CPU shown in FIGS. 17 and 18.

When the product detecting sensor 366 is used, there are provided a plurality of product detecting sensors 366 on the housing 12. The CPU 400 may detect a barcode moving path by tracing the product detecting sensors 366 which respond to barcode's shadow which moves as the barcode moves. Referring to FIG. 20, a description will be given of an exemplary control method in which the CPU 400 detects the optimal inclined angle by detecting a barcode moving path, using the product detecting sensors 366.

Initially, the CPU 400 judges whether or not the barcode scanner 10C having the stage 200 at an inclined angle in an initial state (or operated state) could read a barcode (step 702). Such a judgement is based on whether the CPU 400 or the POS terminal connected to it could understand the read barcode data.

If the barcode is normally read out, then the result is output to the POS terminal via the interface part 410 (step 704), and the CPU 400 maintains the inclined angle at that time. In the step 702, if the barcode cannot be read, the CPU 400 checks the inclined angle of the stage 200 by the inclination apparatus 300 (step 706). Optionally, a step of judging whether the number of reading errors exceeds a predetermined times (for example, three times continuously) may be inserted between the steps 702 and 706. In that case, only if the number of reading errors reaches the predetermined times, the procedure is fed to the step 706, otherwise is fed back to the step 702, prompting the operator to repeat the reading operation.

Next, the CPU 400 obtains information relating to the barcode moving path from the product detecting sensors 366 (step 708), calculates the optimal inclined angle based on the it, and controls the inclination apparatus 300, thereby modifying the current inclined angle to the optimal inclined angle (steps 710 and 712). In this case, it is conceivable that the barcode moving path by the operator was accidentally abnormal to the operator, so the CPU 400 may prompt the operator to move the barcode several times, and calculate the optimal inclined angle from the averaged moving path.

Control of the inclination apparatus 300 is conducted, for example, by controlling driving of the motor 370, which will be described with reference to FIG. 22. Thereafter, the barcode is read with the optimal inclined angle (step 714), but optionally the CPU 400 may inform and/or indicate the operator after the step 712 before the step 714 that the optimal inclined angle has been set.

If the reading operation succeeds, the CPU 400 outputs the result to the POS terminal (step 704), and if the reading operation fails, the CPU 400 prompts the operator to repeat the reading operation since the inclined angle has already been set to be optimal (step 716).

A barcode moving path is also detectable by utilizing light reflected from the barcode. A description will now be given of the CPU 400 in this case. The scanning pattern emitted from the optical unit 100 sequentially moves in the space as the motor 144 rotates. When the scanning pattern properly goes across the entire surface of the barcode, the reading operation succeeds. However, when the scanning pattern goes across only part of the barcode, for example, the read data becomes incomplete. The CPU 400 may monitor this information momentarily, calculate a position of the scanning pattern which reads (even part of) data, and make the inclination of the stage 200 follow the calculation result.

Figure 21:
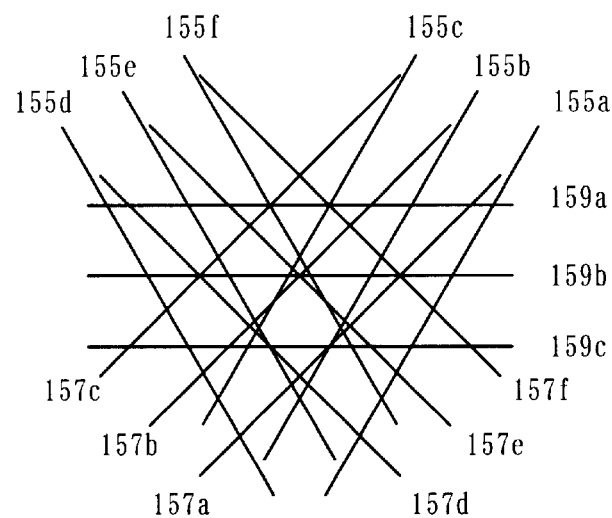
FIG. 21 shows a scanning pattern emitted from a read window.

For example, as shown in FIG. 4, a beam is emitted (as a scanning pattern) in three directions from one stationary mirror 152 as the polygon mirror 140 rotates and each reflection surface 142 changes an inclined angle. For instance, as shown in FIG. 21, a pair of V mirrors 154 generate V patterns 155a through 155f, a pair of H mirrors 156 generate H patterns 157a through 157f, and one Z mirror 158 generates Z patterns 159a through 159c. The generation is repeated, by the rotation of the polygon mirror 140, in the order of 155a, 157a, 159a, 155d, 157d, 155b, 157b, 159b, 155e, 157e, 155c, 157c, 159c, 155f, and 157f, and a barcode is recognized in this order. Therefore, if the barcode data enters in the order of 155d, 155e, and 155f, for example, the CPU 400 recognizes an area of the moving path is close to 155d through 155f and the moving direction is left to right in FIG. 21. Based on this information, the CPU 400 may generate a control signal and control the inclination apparatus 300. Since the CPU 400 obtains an entry order of the barcode data in step 708 (for example, the order of 155d, 155e, and 155f) the control method in this case is similar to the procedure shown in FIG. 20.

Next, a description will now be given of an operation of the CPU 400 when the inclination mechanism 302 comprises the one-dimensional inclination mechanism shown in FIG. 22. The structure is similar to that in FIG. 7 except for the automatic inclination, and a duplicate description will be omitted.

The one-dimensional inclination mechanism shown in FIG. 21 includes motor 370, gearbox 371, motor drive circuit 372 which drives the motor 370, support table 373 which supports the motor 370 and the gearbox 371, potentiometer 374 as an angle detecting device which detects an inclined angle of the stage 200, and support shaft 310 which is connected to and rotatable with the stage 200 and also connected directly or indirectly to and rotatable with the motor shaft (not shown) of the motor 370. The motor drive circuit 372 and the potentiometer 374 are connected to and controlled by the CPU 400. The CPU 400 obtains angular information of the stage 200 from the potentiometer 374, and controls the motor drive circuit 372 based on this information.

The gearbox 371 serves to reduce a speed of the motor 370 and increase torque to be applied to the support shaft 310. Thereby, even the small motor 370 can secure the torque enough to incline the stage 200.

It is understood that when the stage 200 serves as the support shaft 310 the motor 370 is directly connected to the stage 200.

Figure 22:
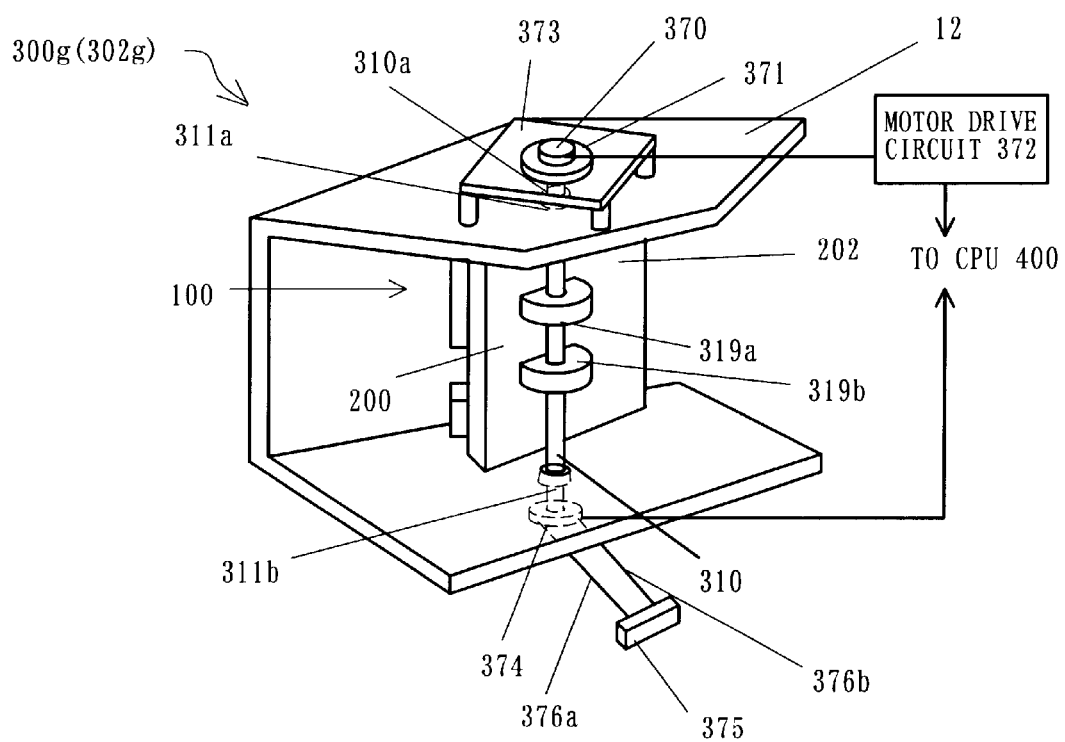
FIG. 22 is a diagram for explaining automatic control of the inclination apparatus shown in FIG. 6.

In general, no securing device which secures the support shaft 310 (and the stage 200) (such as, the gear 314 and the lock pin 316 shown in FIG. 6) is required in the inclination apparatus 300g (inclination mechanism 302g) shown in FIG. 22. This is because that the support shaft 310 is connected to the motor shaft (not shown) of the motor 370, and the motor shaft and the support shaft 310 stops, when the motor drive circuit 372 stops electrifying the motor, in that state. This is common to the following two-dimensional inclination mechanisms having similar structures.

A return to a predetermined position is realized simply by a program (which reversely rotating the motor 370, for example) stored in the CPU 400 or the motor drive circuit 372 in the inclination mechanism 302g shown in FIG. 22. Therefore, no spring member is required to connect the lower surface 202 of the stage 200 to the bottom of the housing 12. This is common to the following two-dimensional inclination mechanisms having similar structures.

No display is generally required in the inclination mechanism 302g in FIG. 22. The primary purpose of the display is to notify the operator of the inclined angle for use with the next operation, but the CPU 400 memorizes the optimal inclined angle for the next operation for each operator. As a result, the operator does not have to memorize it, and the direction indicator dial 312 is not required generally. However, if necessary, the angle detecting device 374 and/or an angle display connected to the CPU 400 may be independently provided. Such an angle display is useful for those operators who would like to actually reconfirm his/her optimal inclined angle. This is common to the following two-dimensional inclination mechanisms having similar structures.

The potentiometer 374 is connected to variable resistor 375 via lead line 376a and 376b. The variable resistor 375 may apply resistance responsive to the rotational angle of the support shaft 310 to the potentiometer 375. When the input voltage is made constant (for example, DC 5V), the resistance value of the variable resistor 375 can be detected by measuring the output voltage, whereby the rotational angle of the support shaft 310 can be detected. The motor drive circuit 372 serves as the moment application means.

Figure 23:
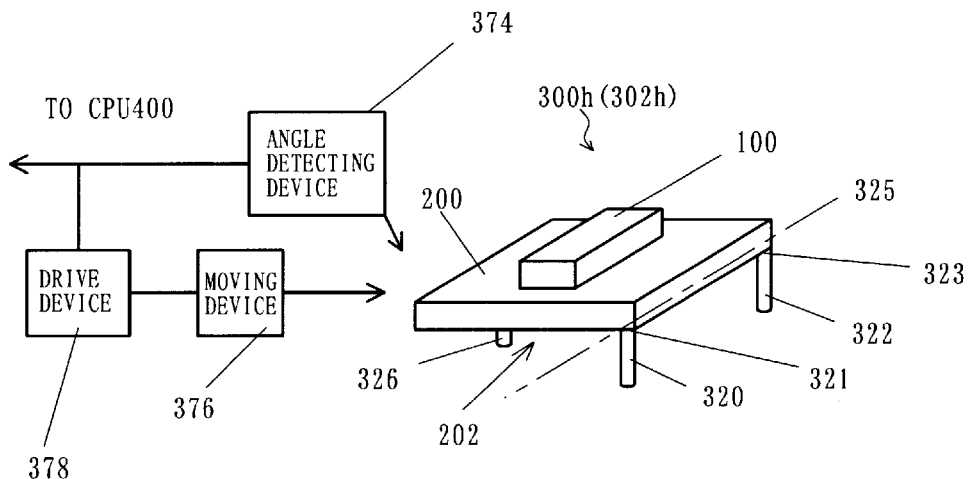
FIG. 23 is a diagram for explaining automatic control of the inclination apparatus shown in FIG. 10.

Next, referring to FIG. 23, a description will be given of inclination apparatus 300h (inclination mechanism 302h) which is an automatic inclination version of the inclination apparatus 300b shown in FIG. 10. The inclination mechanism 302h further includes, in addition to the elements of the inclination mechanism 302b, angle detecting device 374 which detects an inclined angle of the stage 200, moving device 376 which moves the operating shaft 326, and drive device 378 which drives the moving device 376. The moving device 376 and the drive device 378 may broadly utilize any known device in the art. For example, a motor which attaches a cam to the motor shaft is used for the moving device 376 and a motor drive circuit is used for the drive device 378. In this case, the CPU 400 may incline the stage 200 by the predetermined angle by controlling a moving distance of the operating shaft 326 (which is expressed by the rotational angle of the motor shaft).

As shown in FIG. 11, where the operating shaft 328 is provided, the CPU 400 moves the operating shaft 328 up and down. The control method of the moving distance of the operating shaft 328 is similar to those for the moving device 376 and the drive device 378. This is also similar to a case where the support member 330 and the operating shaft 332 are provided as shown in FIG. 13.

Figure 24:
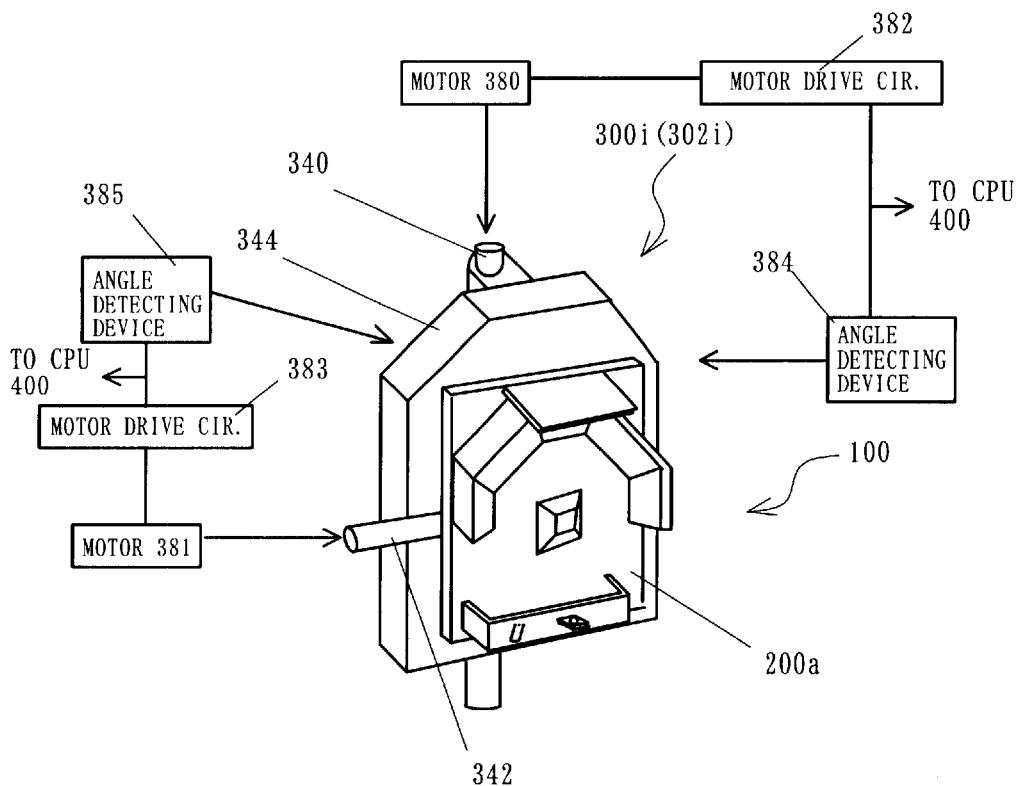
FIG. 24 is a diagram for explaining automatic control of the inclination apparatus shown in FIG. 14.

Referring to FIG. 24, a description will now be given of inclination apparatus 300i (inclination mechanism 302i) which is an automatic inclination version of the inclination apparatus 300e shown in FIG. 14. The inclination mechanism 302i includes, instead of direction indicators 346 and 348, in the elements of the inclination mechanism 302e, motors 380 and 381, motor drive circuits 382 and 383 which drive the motors 380 and 381, angle detecting device 384 which detects an inclined angle of the stage 200a, and angle detecting device 385 which detects an inclined angle of the stage 344. The support shaft 340 is connected directly or indirectly to and rotatable with the motor shaft (not shown) of the motor 380, whereas the support shaft 342 is connected directly or indirectly to and rotatable with the motor shaft (not shown) of the motor 381. The motor drive circuits 382 and 383 and the angle detecting devices 384 and 385 are connected to and controlled by the CPU 400. The CPU 400 obtains angular information of the stages 200a and 344 from the angle detecting devices 384 and 385, and controls the motor drive circuits 382 and 383 based on this information.

When the stage 200a and/or the stage 344 serve as the support shafts 340 and 342, the motors 380 and 381 are connected to the stages 200a and 344.

Each of the angle detecting devices 384 and 385 is similar to the angle detecting device 374. A method for the CPU 400 to obtain the optimal inclined angle is basically the same as that for the one-dimensional inclination mechanism, but it is necessary to heed that the rotary shaft of the stage 200a is not the support shaft 342 but the hinge 350 (see FIG. 15) in FIG. 24. Therefore, the CPU 400 must, in advances, memorize the relationship between the rotational angle of the support shaft 342 and the inclined angle of the stage 200a.

In automatically controlling the inclination apparatus 300f shown in FIG. 16, the CPU 400 may control an inclination angle of the stage 200b by controlling a moving distance of the compression means 364. The moving distance of the compression means 364 is similarly controlled, as shown in FIG. 23, for example, by the angular detecting device 374 connected to the stage 200b, the moving device 376 connected to the compression means 364, and the drive device 378 connected to the moving device 376.

Figure 25:
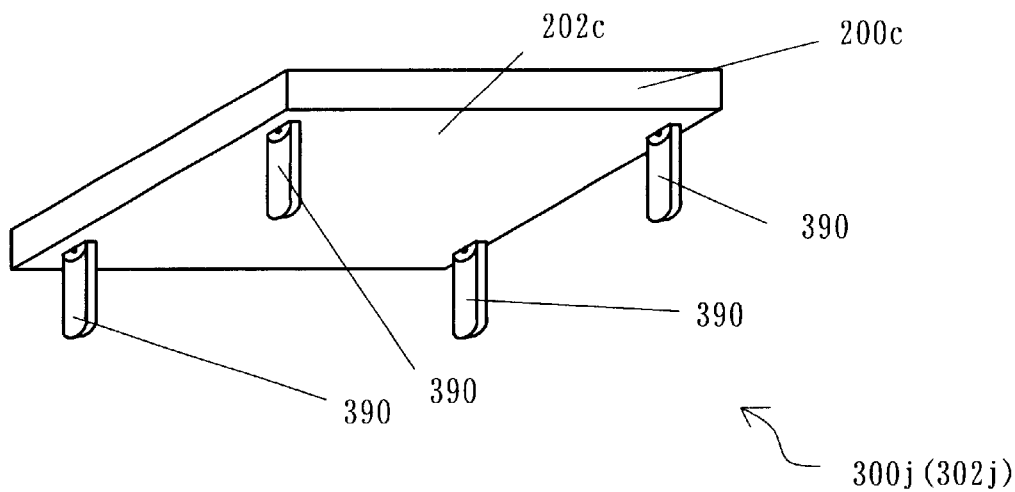
FIG. 25 is a diagram for explaining automatic control of an inclination apparatus different from the inclination apparatus in FIG. 23.

As briefly shown in FIG. 25, which omits the optical unit 100, inclination apparatus 300j (inclination mechanism 302j) may include four support members 390 which are hinged at the lower surface 202c of the stage 200c. Four joints between these four support members 390 and the stage 200c correspond to corners of a square or a rectangle. The stage 200c may be inclined in an arbitrary direction by simultaneously moving up or down the adjacent two support members 390. The CPU 400 similarly controls a moving distance of the compression means 364, as shown in FIG. 23, for example, by using the angular detecting device 374 connected to the stage 200c, the moving devices 376 connected to each support member 390, and the drive device 378 connected to each moving device 376.

Optionally, even when the CPU 400 automatically controls the inclination apparatus 300, an operator may change the setting by manipulating a keyboard near the barcode scanner 10. This is especially useful to avoid double reading when the barcode scanner 10a in FIG. 27 is used.

Figure 26:
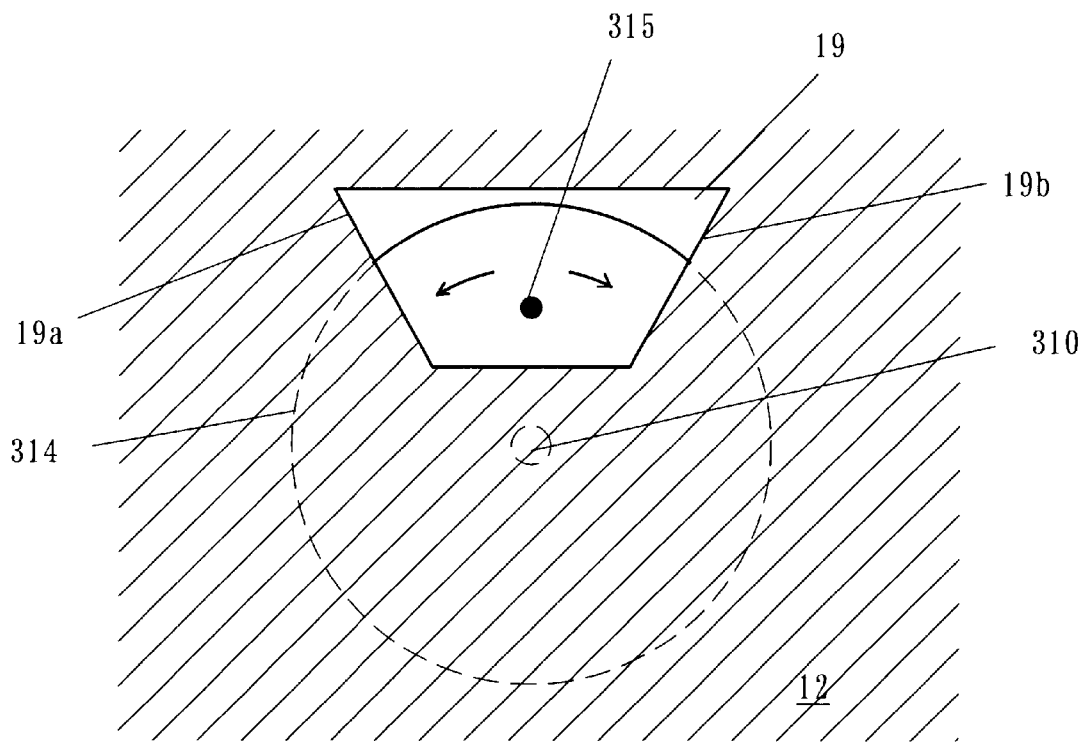
FIG. 26 is a plane view for explaining an example of mechanical restriction to an inclined angle of the inclination apparatus shown in FIG. 6.

Irrespective of the manual and automatic adjustments, the inclinable angle may be restricted so that a scanning pattern does not go into eyes of an operator and/or a customer who stand at a predetermined position and/or the stage 200 (or the optical unit 100) does not collide with the inner wall of the housing 12. The restriction to the rotatable range of the rotational axis is easily available, for example, by a mechanical action or a program in a ROM (not shown) in the CPU 400. The mechanical restriction is available as shown in FIG. 26, for example, where pin 315 provided on the gear 314 coaxial to the support shaft 310 in FIG. 6 is allowed to move in cutout 19 in the housing 12. When the pin 315 rotates clockwise in FIG. 26, its movement is restricted by end 19b of the cutout 19. When the pin 315 rotates counterclockwise in FIG. 26, its movement is restricted by end 19b of the cutout 19. For example, in order to prevent the stage 200 in FIG. 6 from colliding with the housing 12 as a result of inclination, a buffer cushion may be provided inside the housing 12.

A description will now be given of concrete actions of the barcode scanners 10A through 10D of the present invention. In the following discussion, the barcode scanner 10 generalizes the barcode scanners 10A through 10D and direction indicator dials and other elements are omitted in the drawings.

Figure 27:
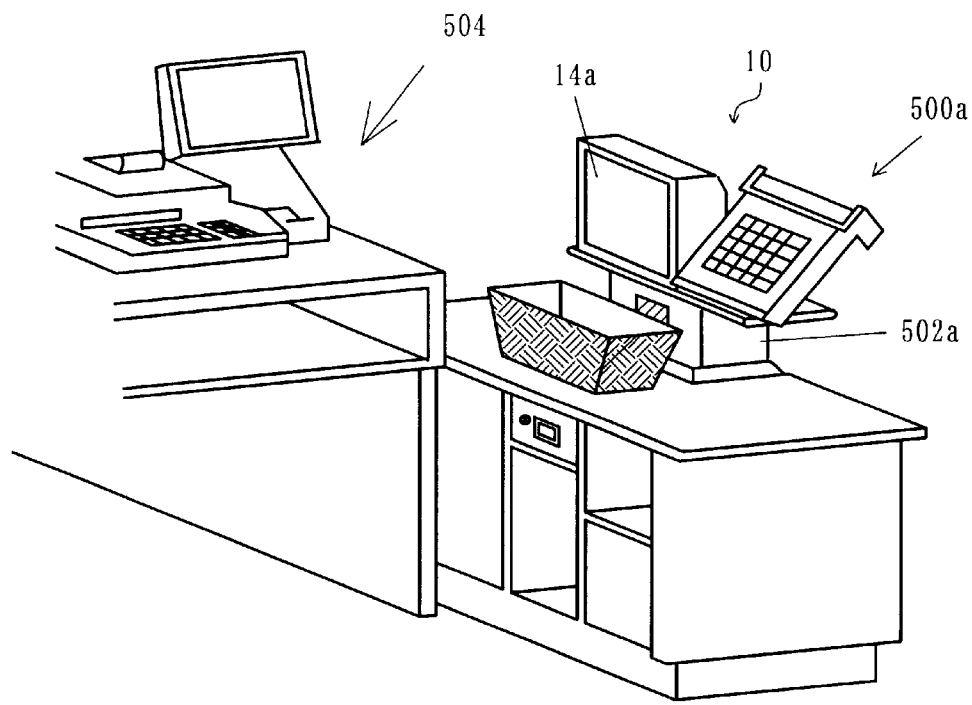
FIG. 27 is a view for explaining a concrete effect of the barcode scanner according to the present invention.
Figure 29:
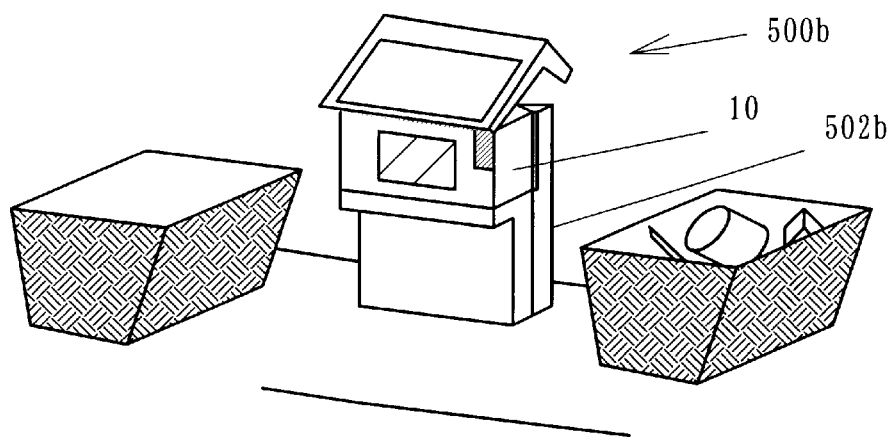
FIG. 29 is still another view for explaining a concrete effect of the barcode scanner according to the present invention.

FIG. 27 shows the barcode scanner 10 installed on post 502a. Keyboard 500a is provided next to the barcode scanner 10. The barcode scanner 10 is connected to POS terminal 504. The barcode scanner 10 shown in FIG. 27 is used as a longitudinal type. The height of the post 502a is adjustable depending upon operator's height. In operation, the operator picks up a merchandise out of a shopping basket that he/she has placed under the barcode scanner 10, makes the barcode scanner 10 read the barcode, and returns the merchandise to the basket. However, if the basket is placed in the scanning-pattern emitting direction of the barcode scanner 10 and has merchandised with barcodes, there is a risk of double reading. As shown in FIG. 29, a method in which another basket is prepared and two baskets are placed at both ends of the barcode scanner 10 may avoid the double reading, but this method is restricted if the cashier table is not wide enough to place two baskets. Accordingly, the operator changes the inclined angle of the stage 200 by a mechanical operation or entry through keyboard 500a so that the basket may be placed outside the reading area of the scanning pattern.

In use, the operator twists the direction indicator dial (not shown) or enters his/her ID through the keyboard 500a, whereby he/she can obtain the optimal inclined angle. In order to set a new inclined angle or change the current inclined angle, the operator conducts the aforementioned simulation. The scanning pattern preinstalled at the time of shipping in a factory is maintained even when the optical unit 100 is inclined, securing highly reliable reading operations. The scanning pattern meets the laser safety standards, securing highly safe reading. A longitudinal barcode scanner may be conveniently used as a lateral barcode scanner after the store-refurbishing etc. simply by changing an inclined angle of the stage 200.

Figure 28:
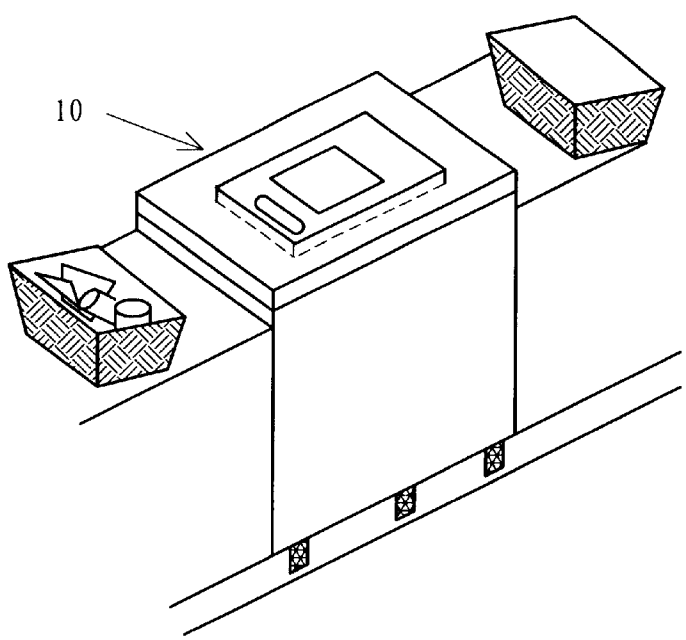
FIG. 28 is another view for explaining a concrete effect of the barcode scanner according to the present invention.

FIG. 28 shows the barcode scanner 10 that is embedded into the cashier table and used as a lateral type. An operator stands at a front side in FIG. 28 and jumps a merchandise from left to right while making the intervening barcode scanner 10 read a barcode on the merchandise. This drawing shows a typical example of the barcode scanner 10 of the present invention. An operator may advantageously stand at the opposite side in FIG. 28 after the store-refurbishing etc., and jump a merchandise from right to left simply by changing an inclined angle of the stage 200.

The barcode scanner 10 shown in FIG. 29 is also installed on post 502b, but the post 502b is not adjustable in height. Keyboard 500b is located on the barcode scanner 10, and the cashier table has a room for two baskets. This drawing also shows one of the most typical examples of the barcode scanner 10 of the present invention.

FIGS. 28 and 29 each have similar effects to those of FIG. 27.

Figure 30:
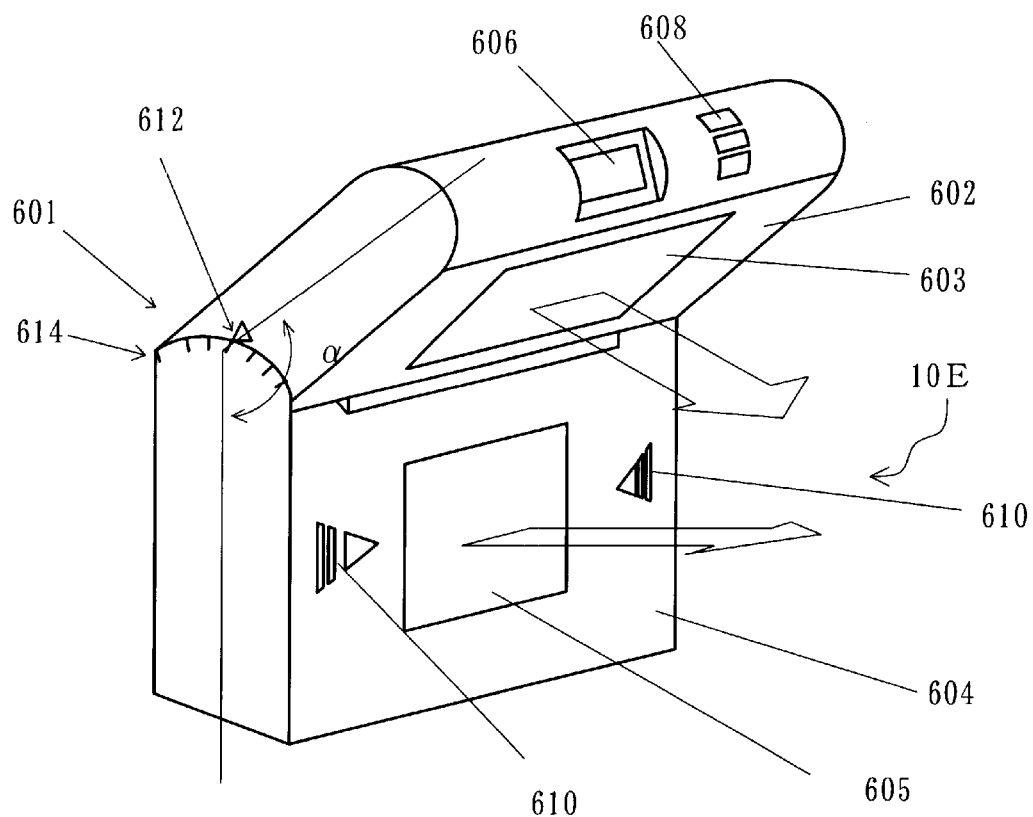
FIG. 30 is a schematic perspective view of a barcode scanner (two-faced scanner) of a fifth embodiment according to the present invention.
Figure 31:
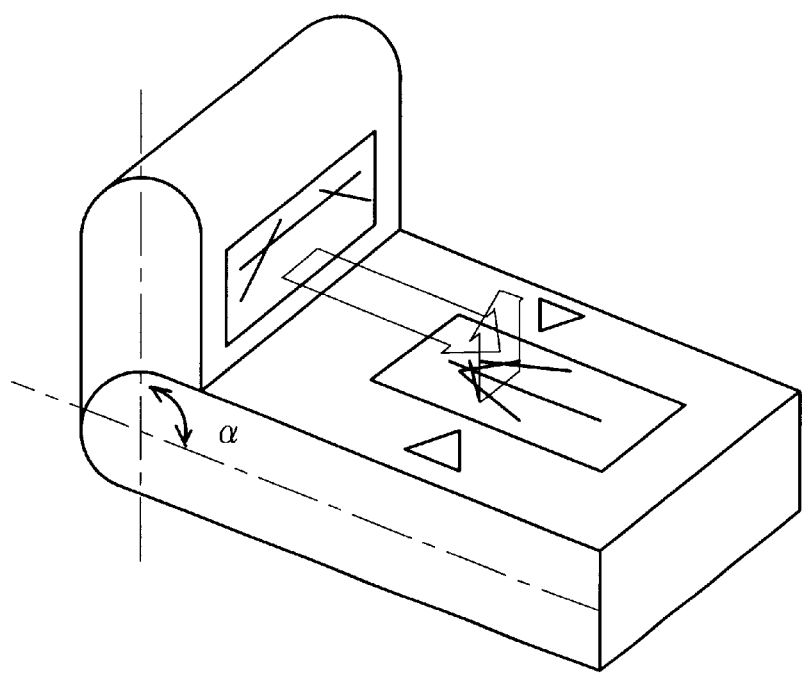
FIG. 31 is a schematic perspective view of the barcode scanner shown in FIG. 30 in which a bending angle is a right angle.

Referring to FIG. 30, a description will now be given of barcode scanner (two-faced scanner) 10E as one example of multi-faced scanners of the present invention. The multi-faced scanners are those barcode scanners which have a plurality of read windows on the housing. The two-faced scanners are those barcode scanners which have two read windows, and some have bendable two parts each having a read window. The two-faced scanner 10E shown in FIG. 30 has bending angle α as an obtuse angle, but the barcode scanner 10 of the present invention is applicable to one which has the bending angle α of an approximately right angle as shown in FIG. 31.

As the two-faced scanner 10E emits scanning patterns from two scanner parts 602 and 604, and scans a barcode from multiple directions, thus providing a reading precision greater than the single-faced scanner. More specifically, the two-faced scanner 10E may improve the reading precision by passing a barcode through an optimal reading area (sweet spot S) near foci (a point where a beam diameter becomes minimum) of two scanning patterns emitted from these two scanner parts 602 and 604. Even though a barcode passes outside the sweet spot S, those barcodes which have wide bar intervals, like a barcode printed on a relatively large merchandise (e.g., a six-roll pack toilet paper) are possibly readable. However, a barcode having narrow bar intervals put on a relatively small merchandise is not always readable properly. A two-faced scanner may keep the sweet spot S wider than usual scanners.

The two-faced scanner 10E of the present invention has two scanner parts 602 and 604 which are bendable at joint 601, guide indicator part 606 and switch 608 attached to the scanner part 602, a pair of reading direction indicators 610 attached to the scanner 604, and arrow mark 612 which indicates the bending angle α between the scanner parts 602 and 604, and scale 614.

In this way, the two-faced scanner 10E is variable in bending angle α. Optionally, the bending angle α may be fixed to the predetermined value and made invariable. The scanner part 602 and/or the scanner part 604 may have a collimeter lens etc., if necessary, so that an emitted beam has a focus in the sweet spot S.

An operator changes the scanning-pattern emitting directions of the scanner parts 602 and 604 in accordance with the bending angle α, changing a position of the sweet spot S. The operator sets the bending angle α to an experimentallydetermined optimal angle, confirming a value on the scale 614 indicated by the arrow mark 612.

Figure 32:
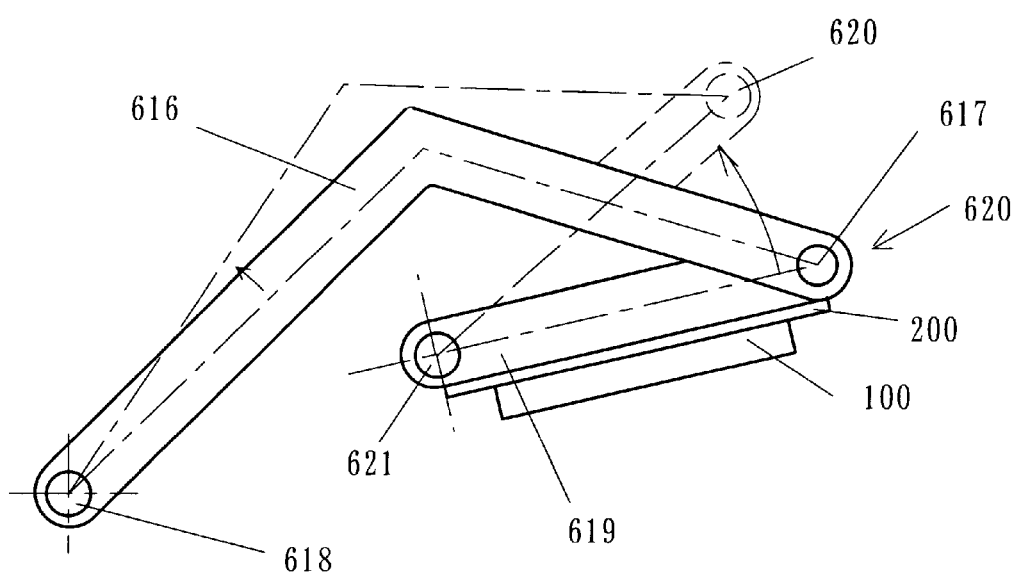
FIG. 32 is a side view showing a relationship between a bending angle and an emitting direction of a scanning pattern in the barcode scanner in FIG. 30.

Next follows a description of a relationship between the scanning-pattern emitting direction of the scanner part 602 and the bending angle α. Referring to FIG. 32, the scanner part 602 has a linkage including movable arm 616 and fixed arm 619. The movable arm 616 includes end 617 which is rotatably connected to the stage 200 which mounts the optical unit 100, and fixed end 618 which is rotatable relative to the scanner part 602. On the other hand, the fixed arm 619 is fixed onto the side of the stage 200, and includes end 620 which is connected to the end 617 of the movable arm 616 and the stage 200, and fixed end 621 which is rotatable relative to the scanner part 602. The movable arm 616 moves in an arrow direction in FIG. 32 as the scanner part 602 moves relative to the scanner part 604 so that the bending angle α may increase. Thereby, the ends 617 and 620, the stage 200, and the optical unit 100 rotate counter-clockwise around the fixed ends 618 and 621 as fulcrums. Therefore, as the bending angle α changes, the scanning-pattern emitting direction of the scanner part 602 changes accordingly.

Figure 33:
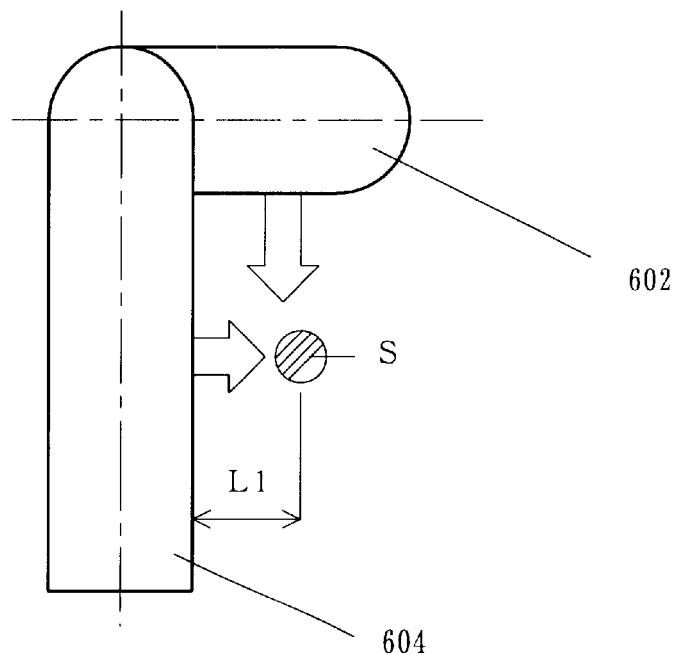
FIG. 33 is a side view for explaining a sweet spot of the barcode scanner shown in FIG. 31.
Figure 34:
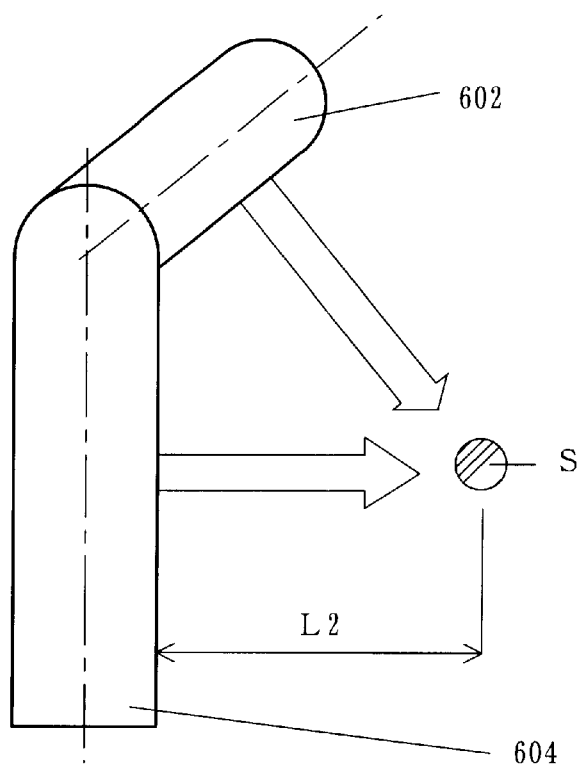
FIG. 34 is a side view for explaining a sweet spot of the barcode scanner shown in FIG. 30.

For example, the two-faced scanner in FIG. 31 enables the scanner parts 602 and 604 to emit scanning patterns in directions perpendicular to the read windows 603 and 605, respectively. Therefore, as shown in FIG. 33, the sweet spot S is formed near a position where focus distance (or optimal depth) L from the scanner part 604 is L1. On the other hand, in the two-faced scanner in FIG. 29, the scanner part 602 emits scanning pattern at acute angle with respect to the read window 603. Therefore, as shown in FIG. 33, the sweet spot S is formed near a position where a focus distance L from the scanner part 604 is L2. Small L (e.g., L=L1) is used to read small barcodes printed on a small merchandise, whereas large L (e.g., L=L2) is used to read large barcodes printed on a large merchandise. For example, in an attempt to read out a barcode printed on a six-roll pack toilet paper, if L is set to be L1, the merchandise collides with the scanner part 602 and cannot pass through the sweet spot S. When a barcode is located at the sweet spot S, two beams hit the barcode, whereby they are reflected and scattered. The reflected light then returns to the optical unit 100 in a path reverse to the scan light.

Figure 35:
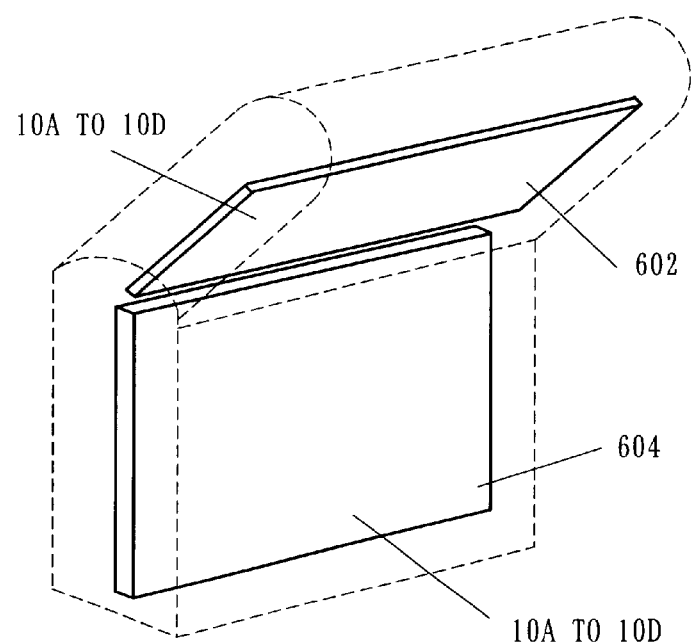
FIG. 35 is a transparent perspective view of essential part showing an inner structure of the barcode scanner shown in FIG. 30.

As shown in FIG. 35, the scanner parts 602 and 604 each generally correspond to one of the barcode units 10A through 10D. A variation which simplifies a structure is available; for instance, one CPU 400 may control both scanner parts 602 and 604. Thus, even after the bending angle α is determined, and the scanning-pattern emitting direction of the scanner part 602 is determined by the linkage shown in FIG. 31, the stage 200 (and optical unit 100) can be changed in inclined angle, of course.

The guide indicator part 606 in FIG. 30 indicates a set value of the bending angle α, a size of merchandise corresponding to the set value (for example "L", "M", and "S"), an image which expresses the reading area, information of whether the reading has been succeeded, information of the read merchandise (such as, price), shopping information, manipulation information, breakdown information of each part, and the like. The switch 608 may switch these information.

The guide indicator part 606 primarily serves to improve a working efficiency by providing an optimal manipulation to an inexperienced operator. Thereby, the operator may secure the optimal manipulation by adjusting the bending angle α, changing the inclined angle of the stage 200, and the like. Alternatively, the guide indicator part 606 may be located at a position where a customer and the operator both can easily see it, for example, at the top of the scanner part 602. Thus, the guide indicator part 606 can be used to improve service to customers, for example, to have the customer confirm the price of the shopped goods, to provide shopping information (for example, sales information) to the customer, etc.

The guide indicator part 606 is provided with the scanner part 602, but may be formed as a different unit from the scanner part 602 or integrated with the keyboard unit. The guide indicator part 606 is made of an LED or LCD which indicate only letters, or a TFT or plasma display which can indicate images, and the like.

Figure 36:
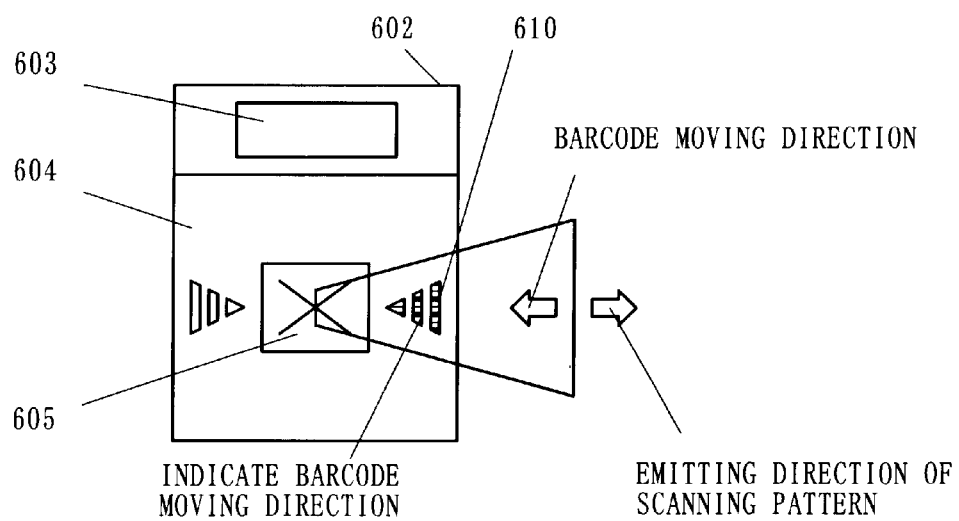
FIG. 36 is a top view for explaining a reading direction indicator of the barcode scanner shown in FIG. 30.

The reading direction indicator 610 includes arrow marks. The arrow mark corresponding to a merchandise moving direction turns on. For example, as shown in FIG. 36, where a merchandise moves right to left, the right arrow mark which indicates the moving direction turns on, and the scanner part 604 emits the scanning pattern in the right direction.

Further, the present invention is not limited to these preferred embodiments, but various variations and modifications may be made without departing from the scope of the invention. For example, the barcode scanner of the present invention is not limited to those fixed onto a cashier table and the like, but is broadly applicable to hand-held type barcode scanners in which an operator approaches an optical reading part to a barcode, and optical readers which emit a scanning pattern to an optically readable medium.

According to the optical reader of the present invention, the variable emitting direction of the scanning pattern enables uniform manufacturing of the optical reader, without distinction of longitudinal and lateral types and barcode moving directions. An operator may adjust an emitting direction in accordance with his/her height and experience to obtain prompt reading operations without practicing manipulations necessary for the conventional devices. Moreover, the maintained optimal scanning pattern provides a high reading reliance and meets the laser standards safely.

What is claimed is:

1. An optical device, comprising:

a bendable housing which has a plurality of reading windows;

a plurality of optical units accommodated in said housing, the number of said optical units corresponding to the number of reading windows, said optical units generating a plurality of scanning patterns, emitting the plurality of scanning patterns to an optically readable medium, and scanning the optically readable medium near a predetermined position intersecting the plurality of scanning patterns;

a stage, accommodated in said housing, which mounts an optical system at least necessary to generate the plurality of scanning patterns from among said optical unit; and an inclination apparatus, accommodated in said housing, which inclines said stage, wherein one of said optical units always maintains a steady scanning pattern, and wherein said plurality of scanning patterns always cross regardless of a bending state of said bendable housing.

* * * * *